US011685043B2

(12) United States Patent
Zhang et al.

(10) Patent No.: US 11,685,043 B2
(45) Date of Patent: Jun. 27, 2023

(54) MECHANICAL ARM

(71) Applicant: UBTECH ROBOTICS CORP LTD, Shenzhen (CN)

(72) Inventors: Chengkun Zhang, Pasadena, CA (US); Liang Huang, Shenzhen (CN); Jianbo Li, Shenzhen (CN); Jingchen Li, Shenzhen (CN); Hongyu Ding, Shenzhen (CN); Wenhua Fan, Shenzhen (CN); Won Suk You, Pasadena, CA (US); Raymond Ma, Pasadena, CA (US); Muhammed Rasid Pac, Temple, CA (US); Huan Tan, Pasadena, CA (US); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 195 days.

(21) Appl. No.: 16/902,205

(22) Filed: Jun. 15, 2020

(65) Prior Publication Data
US 2021/0347038 A1    Nov. 11, 2021

Related U.S. Application Data

(63) Continuation-in-part of application No. 16/870,903, filed on May 9, 2020, now Pat. No. 11,518,042.

(51) Int. Cl.
*B25J 9/04*     (2006.01)
*B25J 17/00*    (2006.01)
(Continued)

(52) U.S. Cl.
CPC ............. *B25J 9/046* (2013.01); *B25J 13/085* (2013.01); *B25J 13/086* (2013.01); *B25J 17/00* (2013.01); *B25J 19/0004* (2013.01); *B25J 9/126* (2013.01)

(58) Field of Classification Search
CPC ........ B25J 18/04; B25J 13/085; B25J 13/086; B25J 9/126; B25J 9/046; B25J 9/047
See application file for complete search history.

(56) References Cited

U.S. PATENT DOCUMENTS 5,293,107 A * 3/1994 Akeel .................. B25J 19/0029
                                                           310/83
11,130,227 B2 * 9/2021 Toshimitsu ............ B25J 9/1676
(Continued)

FOREIGN PATENT DOCUMENTS

JP    2017189081 A  * 10/2017 .............. B25J 19/00
KR     102099581 B1 *  4/2020
(Continued)

OTHER PUBLICATIONS

"Robotics Technology—Arms" electronicsteacher.com (Year: 2017).*

*Primary Examiner* — Randell J Krug

(57) ABSTRACT

A mechanical arm includes a first link connectable to a surface, a second link, a third link, a fourth link, and a fifth link that are coupled to one another in series, and an end effector connectable to the fifth link. The end effector is rotatable about an axis of rotation same as an axis of rotation of the fourth link, and rotatable about an axis of rotation orthogonal to the axis of rotation of the fourth link. The first link, the second link, the third link, the fourth link, and the fifth link are collectively structured and configured to rotate such that the end effector is actuatable to a workspace under the surface.

7 Claims, 30 Drawing Sheets

(51) Int. Cl.
  *B25J 13/08* (2006.01)
  *B25J 19/00* (2006.01)
  *B25J 9/12* (2006.01)

(56) References Cited

U.S. PATENT DOCUMENTS

2013/0041509 A1* 2/2013 Saito .................. B25J 9/042
                                                    700/245
2018/0001487 A1* 1/2018 Miyasaka .............. B25J 9/0009
2018/0169868 A1* 6/2018 Jackowski ............. H02K 11/25
2019/0299417 A1* 10/2019 Kusaka ................ B25J 17/0241
2020/0101625 A1* 4/2020 Lin ..................... B25J 19/0041

FOREIGN PATENT DOCUMENTS

KR      20200132768 A   * 11/2020
WO    WO-2017033379 A1 * 3/2017 ............. A61B 34/32

* cited by examiner

MECHANICAL ARM

CROSS REFERENCE TO RELATED APPLICATION

This application is a continuation-in-part of and claims priority to co-pending application Ser. No. 16/870,903, which was filed on May 9, 2020. The application is incorporated by reference herein in its entirety.

TECHNICAL FIELD

The present disclosure generally relates to mechanical arms, and particularly to a foldable mechanical arm with optimized reachability.

BACKGROUND

A mechanical arm is often divided into multiple links. The links are connected by rotary joints allowing either rotational motion or translational (linear) displacement. The links can be considered to form a kinematic chain. These mechanical arms can be used in robots. A robotic arm is usually used in the industrial or manufacturing fields, where it is fixed to one position and, via articulation of the rotary joints, performs tedious and repetitive tasks, such as welding, painting, assembly, and picking and placing operations. Because of the large-scale work performed, these robotic arms are often large, bulky, and are not foldable.

Lesser known robotic arms are used in more specialized industries, such as the healthcare industry. In a hospital type of environment, workspace areas are far more constrained than in large manufacturing facilities and, thus, bring new problems. As a result, robotic arms in hospitals are often much simpler and are mainly used as an attachment to a robot body to give robots more human-like qualities, or for simple pick and place operations, such as moving a medicine bottle from one place to another. In such a movement operation, the robotic arms suffer from limited reachability and have a limited degree of movement in the vertical plane. Moreover, these robotic arms are often not foldable and stowable when not in use, which is of a concern because of the limited workspace available in hospitals and for the potential to be bumped into by others.

Additionally, because of the need to handle only small, low mass objects in the simple and place operations, these robots have a low payload capacity and are often not modular, and thus cannot be applied in more varied industries, such as picking up and placing heavier food trays in restaurants, without significant re-design of the system.

Therefore, there is a need to provide a mechanical arm to overcome the above-mentioned problems.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
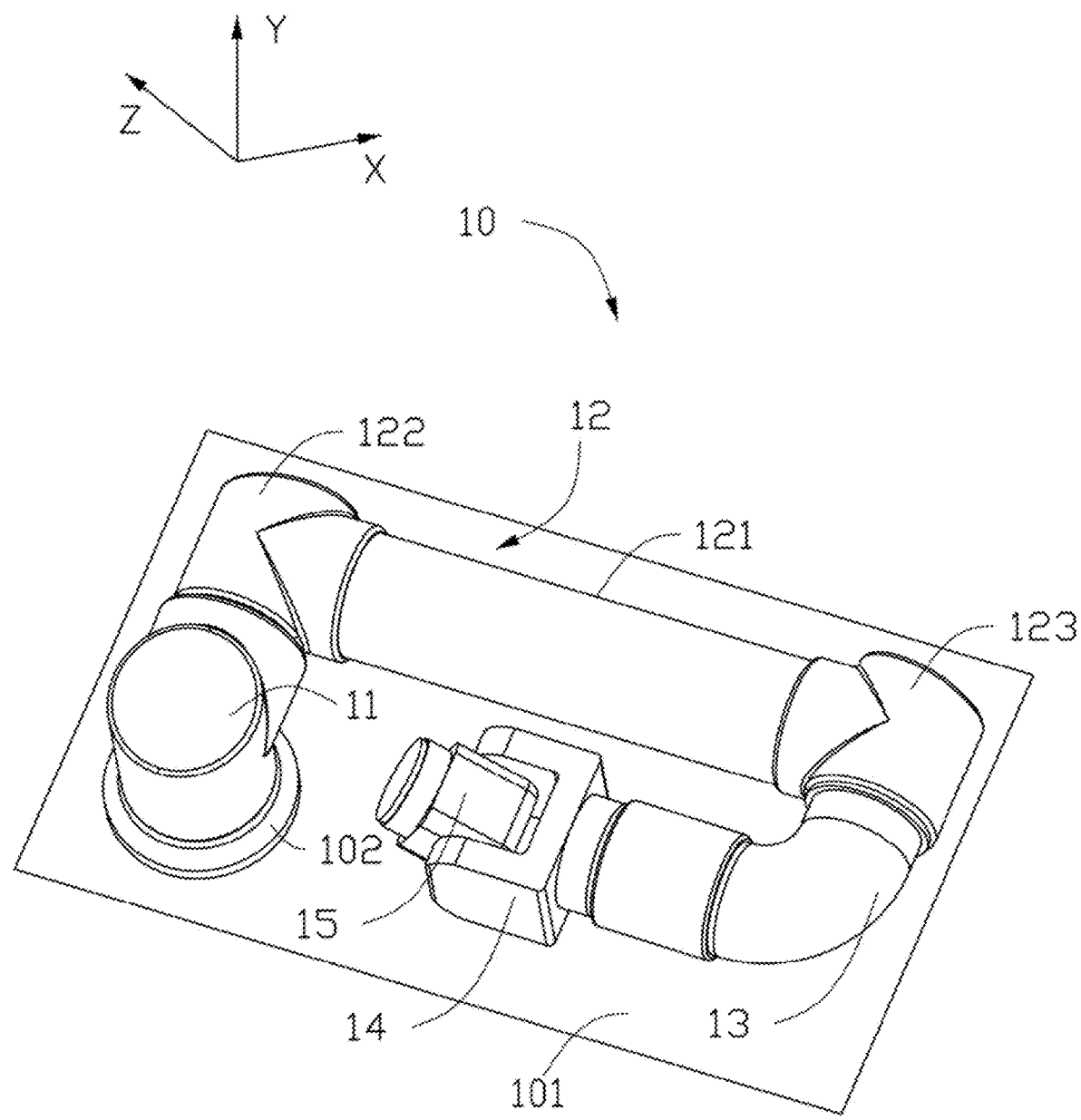
FIG. 1 is an isometric view of one embodiment of a mechanical arm in a folded state.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

As used herein, the term "workspace" is defined as a location or an area in either two-dimensional or three-dimensional space.

As used herein, the term "pick and place" is the process of picking up one or more items from a first workspace, via a mechanical arm, and placing the one or more items to a second workspace. The second workspace may be a shelf, a storage drawer/cabinet, a table, a different room, and can include varied heights, such as being at a height lower than or higher than the first workspace.

It should be understood that the ability of a mechanical arm and an associated end effector to grasp and manipulate objects during pick and place operations depends on the kinematic structure of the mechanical arm, its anchoring position in the physical space, on the relative location of the objects with respect to the mechanical arm, and on environmental restrictions. How far and how capable the mechanical arm in moving to and within a workspace is referred to as the reachability of the mechanical arm. This can be determined according to a reachability map, where representation of the reachability is given by a spatial grid which covers the position or a position and orientation workspace.

It should be appreciated that a reachable workspace of a mechanical arm is not necessarily sphere-shaped when the radius of this space is the length of the fully extended mechanical arm, where within this region, the mechanical arm and an associated end-effector, can move freely. On the contrary, the reachable workspace fully depends on the constraints imposed on the links of the mechanical arms and associated arm joints. The present disclosure will illustrate a mechanical arm, having an end effector, that is able to reach a workspace that is under and/or below a surface of a first link of the mechanical arm despite the constraints imposed on the mechanical arm.

FIG. 1 is an isometric view of a mechanical arm or mechanical arm 10, in a folded state, that can be used to perform tasks, such as picking and placing objects, and other repetitive or non-repetitive tasks. The mechanical arm 10, in one embodiment, can be attached to a fixed location or be attached to a moveable platform. The moveable platform may have one or more storage units under and proximate to the arm, where the mechanical arm 10 is configured to actuate and reach inside the storage units and perform pick and place operations, among other varied things, as will be explained in further detail herein. In one embodiment, the mechanical arm 10 may be employed in healthcare facilities, such as a hospital, an elderly care facility, and the like, to aid healthcare professionals in their daily tasks. However, it should be understood that, due to its modularity, the mechanical arm 10 may be employed in other facilities, such as warehouses, packaging facilities, schools, and restaurants, and may perform tasks such as machine tending, packaging and palletizing, quality inspection, safety checking, food serving, and the like.

Figure 2:
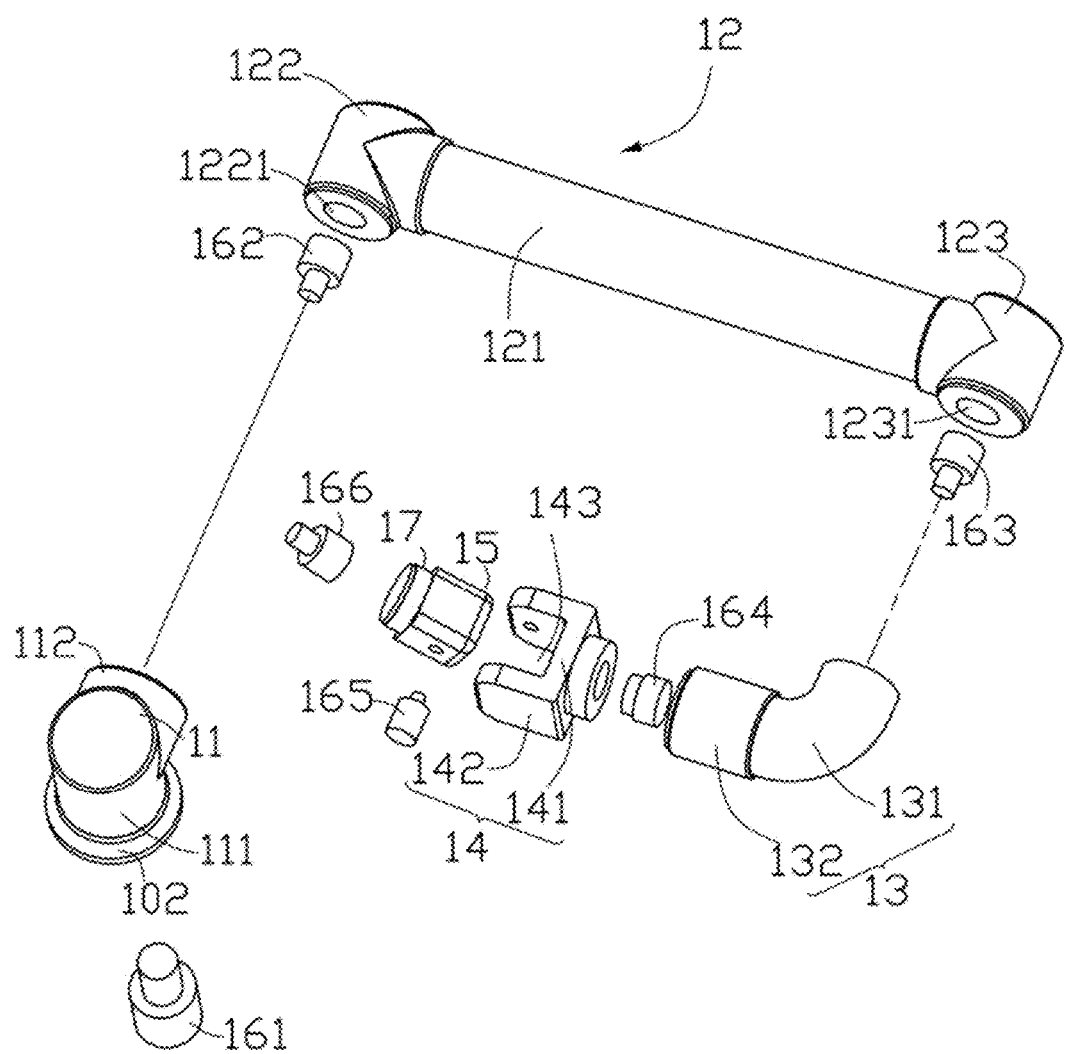
FIG. 2 is an isometric exploded view of the mechanical arm of FIG. 1.
Figure 3A:
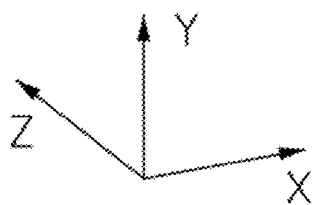
FIG. 3A is an isometric view of the mechanical arm with an end effector attached to the mechanical arm.
Figure 3A:
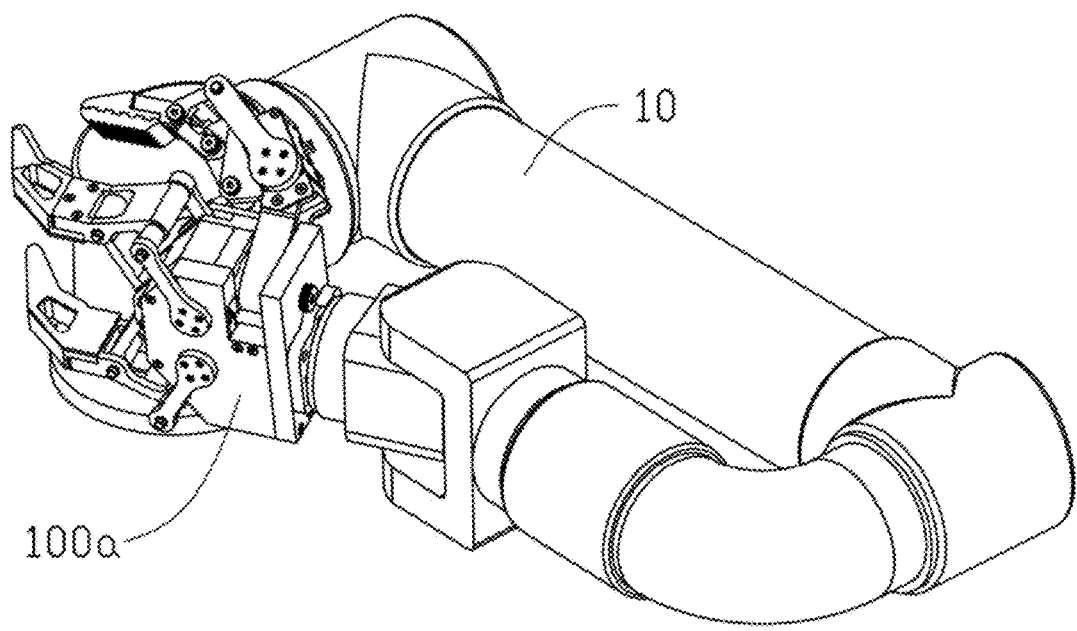

With reference to FIGS. 1, 2 and 3A, in one embodiment, the mechanical arm 10 includes a first link 11, a second link 12, a third link 13, a fourth link 14, a fifth link 15, and an end effector 100a (otherwise known as an "end of arm tooling" (EOAT)). The first link 11 is connectable to a surface 101, such as the top of a moveable platform. Opposite ends of the second link 12 are rotatably coupled to the first link 11 and the third link 13, and opposite ends of the third link 13 are rotatably coupled to the second link 12 and the fourth link 14. The fifth link 15 is rotatably coupled to one end of the fourth link 14 away from the third link 13. The effector 100a is connectable to the fifth link 15. The first link 11 may also be referred to as a joint module J12 because a first revolute joint and a second revolute joint are received in the first link 11. The third link 13 may also be referred to as joint module J34 because a third revolute joint and a fourth revolute joint are received in the third link 13. The fourth link 14 may also be referred to as joint module J5 because a fifth revolute joint is fixed to the fourth link 14. The fifth link 15 may also be referred to as joint module J6 because a sixth revolute joint is received in the fifth link 15. These revolute joints will be explained in detail below. The second link 12 is rotatable about an axis of rotation orthogonal to an axis of rotation of the first link 11. The third link 13 is rotatable about an axis of rotation same as an axis of rotation of one end of the second link 12. The fourth link 14 is rotatable about an axis of rotation orthogonal to the axis of rotation of the third link 13. The end effector 100a is rotatable, together with an output shaft of the sixth revolute joint in the fifth link 15, about an axis of rotation same as the axis of rotation of the fourth link 14, and rotatable about an axis of rotation orthogonal to the axis of rotation of the fourth link 14. The first link, the second link 12, the third link 13, the fourth link 14, and the fifth link 15 are collectively structured and configured to rotate, via joints, such that the end effector 100a is actuatable to a workspace under the surface 101.

The first link 11 has a limited height with respect to the surface 101 and provides support for the other links. The first link 11 is rotatably coupled to the surface 101 and includes a joint (e.g., revolute joint) for rotatably connecting the first link 11 to the surface 101 and electronic components associated with the revolute joint. The second link 12 is coupled to a side of the first link 11 such that the second link 12 is rotatable about an axis of rotation orthogonal to the axis of rotation of the first link 11. The second link 12 may be elongated such that rotation of the first link and the second link 12 allows the mechanical arm 10 to have an extended reachability.

Shape of the third link 13 may be contoured to have a portion that extends in a direction that is parallel to an extending direction of the second link. As a result, the first link 11, the second link 12 and the third link 13 are structured and configured to actuate in such a way that allows for the first link 11, the second link 12 and the third link 13 to be configured in the folded state. In one embodiment, in the folded state, the first link 11, the second link 12 and the third link 13 can be substantially parallel to (i.e., planar to) the surface 101. Additionally, in the folded state, shape of the third link 13 is contoured such that an end of the fifth link 15, away from the third link 13, faces the first link 11. This allows for the end effector to face in a direction towards the first link 11, in the folded state. This arrangement of the links allows for the mechanical arm 10 to be highly compact and stowable. It should be noted that the configuration of the mechanical arm 10 in the folded state can change according to actual needs. For example, the configuration of the mechanical arm 10 in the folded state may not be a perfect planar configuration, and the mechanical arm 10 can still be compact and stowed in a slightly different manner.

The fourth link 14 is rotatable about an axis of rotation orthogonal to the axis of rotation of the third link 13. The fourth link 14 may extend in a direction that is parallel to the extending direction of the second link 12. The fifth link 15 is rotatable about an axis of rotation orthogonal to the axis of rotation of the fourth link 14. In another embodiment, the mechanical arm 10 may include a sixth link 17 (FIG. 2) that is rotatably coupled to the fifth link 15, and has an axis of rotation orthogonal to the axis of rotation of the fifth link 15. The end effector 100*a* may be attached to and rotatable together with the sixth link 17. The sixth link 17 is configured to, in conjunction with the first link 11, the second link 12, third link 13, the fourth link 14, and the fifth link 15, actuate to a workspace under the surface 101, and on a side and below the surface 101. This allows the end effector 100*a* to perform pick and place operations inside an internal workspace of storage units of a movable platform, which will be explained in detail below.

Rotational movement of the links of the mechanical arm 10 allows the end effector 100*a* to be in a determined pose for a specified object. The determined pose is defined to mean that the end effector 100*a* is controlled to be in a specific position and specific orientation which allows the end effector 100*a* to grasp a specified object.

Figure 3B:
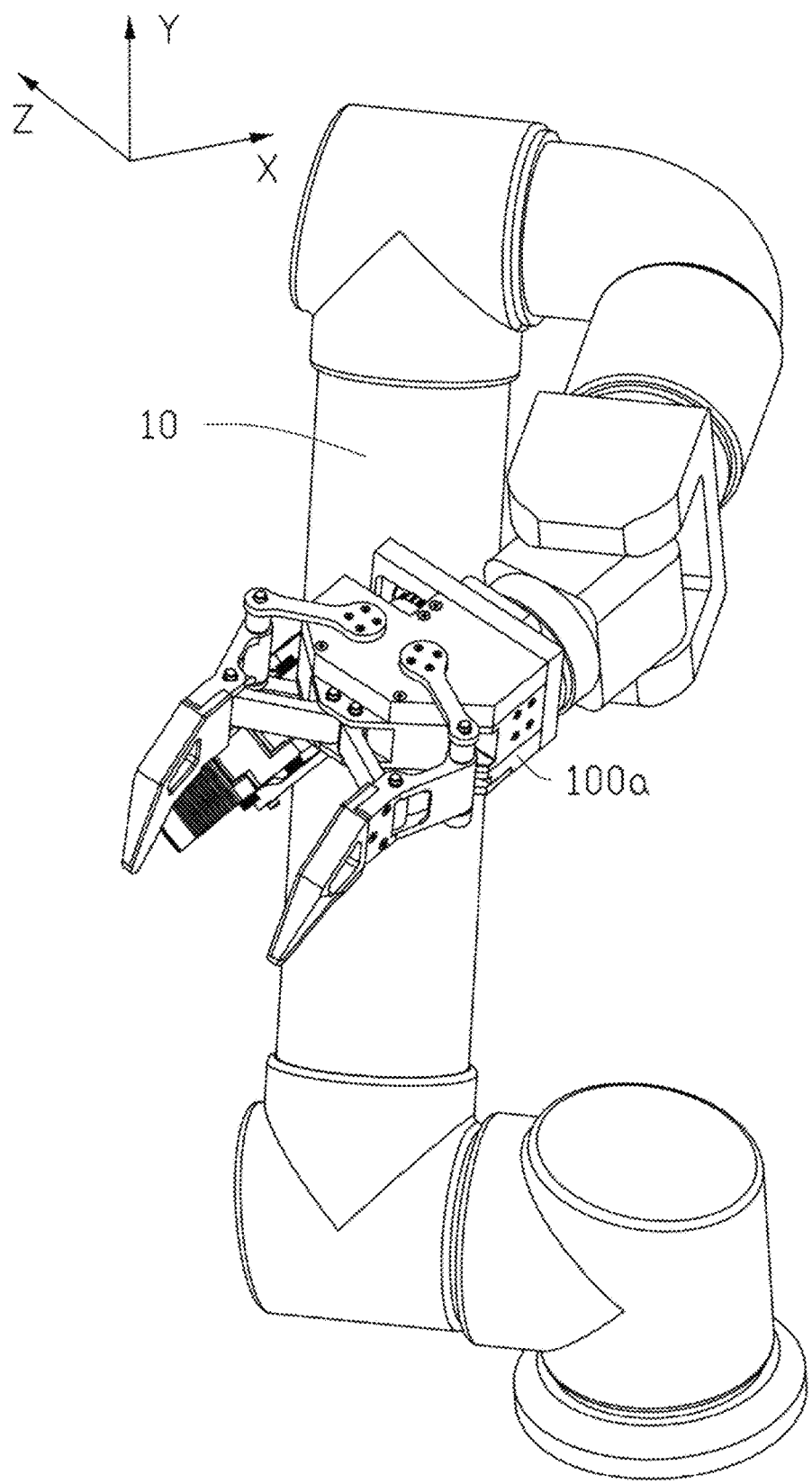
FIG. 3B shows the mechanical arm and the end effector in an intermediate state during an object manipulation task.
Figure 3C:
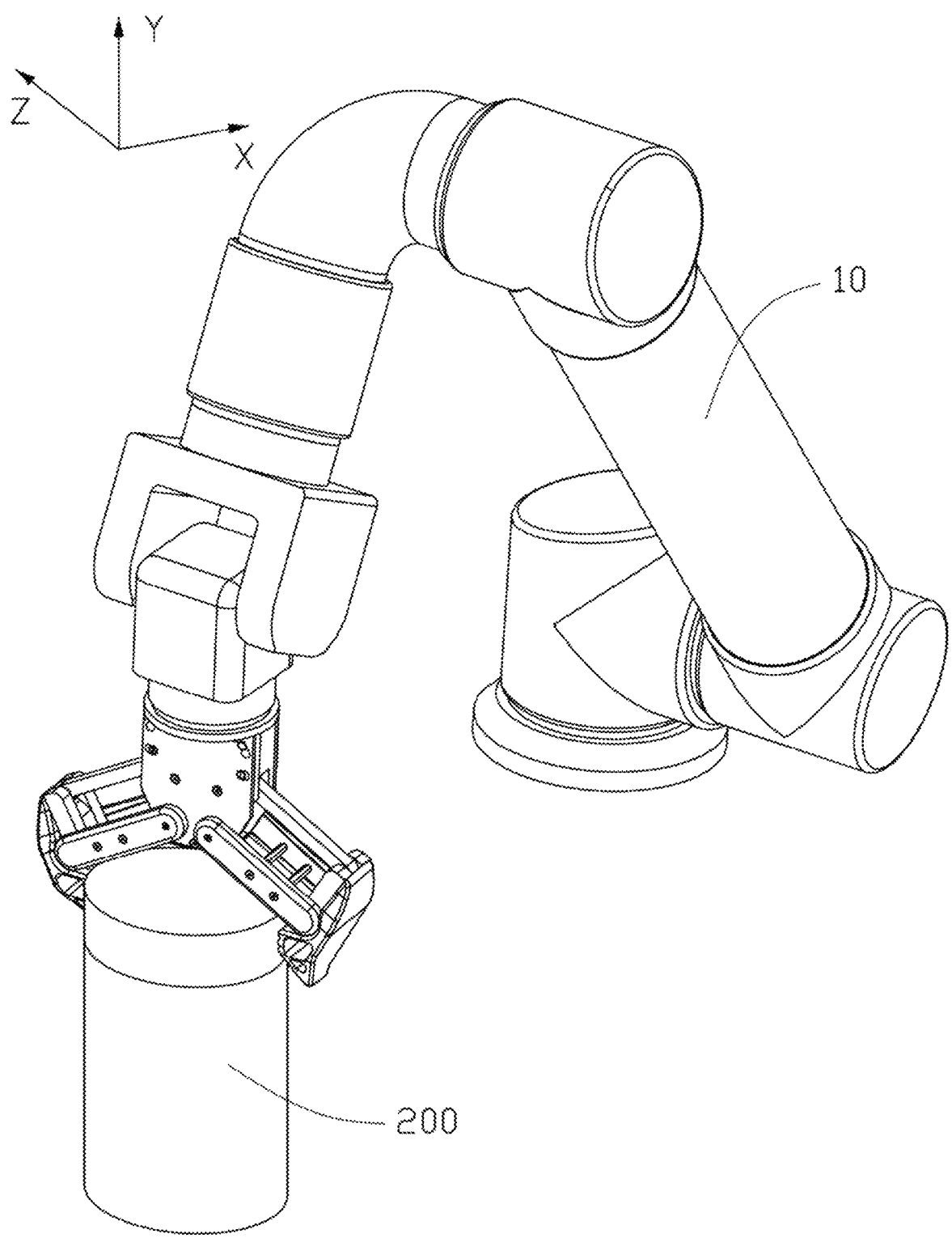
FIG. 3C shows the mechanical arm in a final state during the object manipulation task, with an end effector of another embodiment attached to the mechanical arm.

Rotational movement of the links of the mechanical arm 10 can be independently controlled, which enables the mechanical arm 10 to be in various determined poses during object manipulation tasks. For example, FIG. 3A to 3C show the change of the state of the mechanical arm 30 during an exemplary pick and place operation, including a folded state (FIG. 3A), an intermediate state (FIG. 3B), and a final state (FIG. 3C) to grasp a specified object 200 (e.g., medicine bottle, a jar, gloves, pen, food tray). In one embodiment, brakes can be mated to corresponding revolute joints in at least one of the first link 11, the second link 12, the third link 13, the fourth link 14, the fifth link 15, and the sixth link 17, and are configured to selectively stop movement of the mechanical arm 10, so as to hold the mechanical arm 10 in a determined pose. Further description of the brakes will be explained below.

Figure 4A:
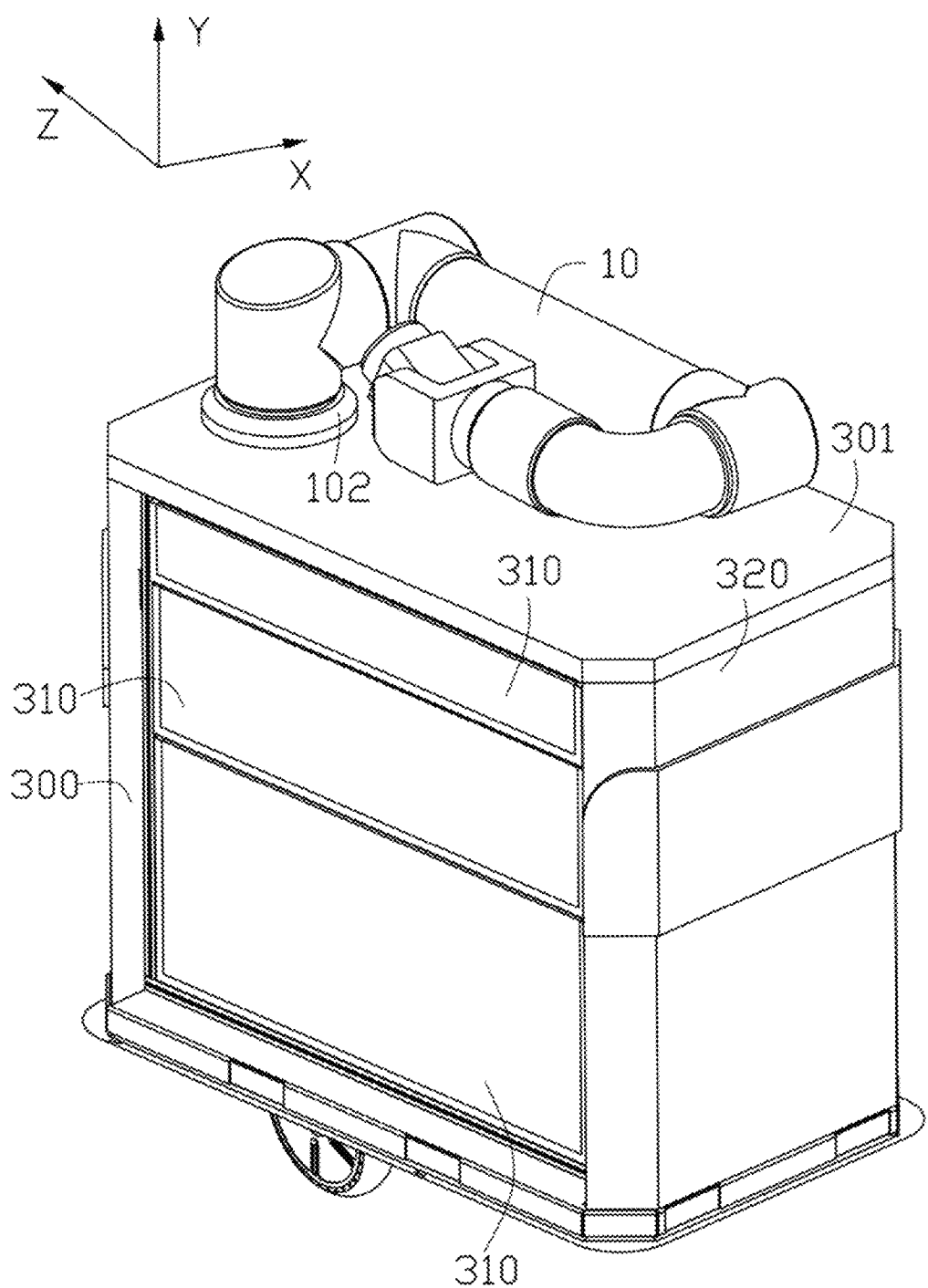
FIG. 4A is an isometric view of the mechanical arm fixed to a movable platform according to one embodiment.

With reference again to FIGS. 2 and 4A, in one embodiment, the mechanical arm 10 may be attached to the top surface 301 of a movable platform 300. In one embodiment, for maximum reachability, base of the first link 1I may be slightly offset from center of the top surface 301. In another embodiment, base of the first link may be positioned adjacent to one of four corners of the top surface 301. The distance between the base of the first link 11 and the center or corners of the top surface 301 can change according to actual needs and according to, but not limited to, length of the links, length and width of the top surface 301, and height of the moveable platform 300. The movable platform 300 may include one or more storage units 310 (e.g., drawers or shelves) that are stacked in a vertical and/or horizontal direction under the top surface 301. FIG. 4A shows the mechanical arm 10 in the folded state, where the second link 12, the third link 13, the fourth link 14, and the fifth link 15 are substantially parallel to (i.e., planar to) the top surface 301 of the movable platform 300.

In this folded state, height of each of the second link 12, the third link 13, the fourth link 14, and the fifth link 15, with respect to the top surface 301 of the moveable platform 300, is less than a height of the first link 11 with respect to the top surface 301. In another embodiment, height of each of at least the second link 12 and the third link 13 with respect to the top surface 301, is less than a height of the first link 11 with respect to the top surface 301. The fourth link 14 may be structured to extend along in the positive y-axis, so as to have a reduced distance between one end of the third link 13 away from the second link 12 and the end effector. As a result, the fourth link 14 and the fifth link 15 may have a height slightly greater than the height of the first link 11. Compared to the unfolded or extended state as shown in FIGS. 3B and 3C, the mechanical arm 10 in the folded state in FIG. 4A, as a whole, can fit on the top surface 301 of the moveable platform 300 and be parallel to the top surface 301. As a result, the mechanical arm 10 can be compact and stowed away, to avoid bumps from people in limited workspace areas, and is user friendly when used in applications such as health care and elderly care because of its less industrial arm looking. In one embodiment, the first link 11 may include a body 111 that is vertical and orthogonal to the top surface 301 of the moveable platform 300. A lower end of the body 111 is fixed to the top surface 301 through a base 102. The first link 11 may further include a connection portion 112 protruding from the lateral surface of the body 111. The second link 12 is coupled to the connection portion 112.

Figure 4B:
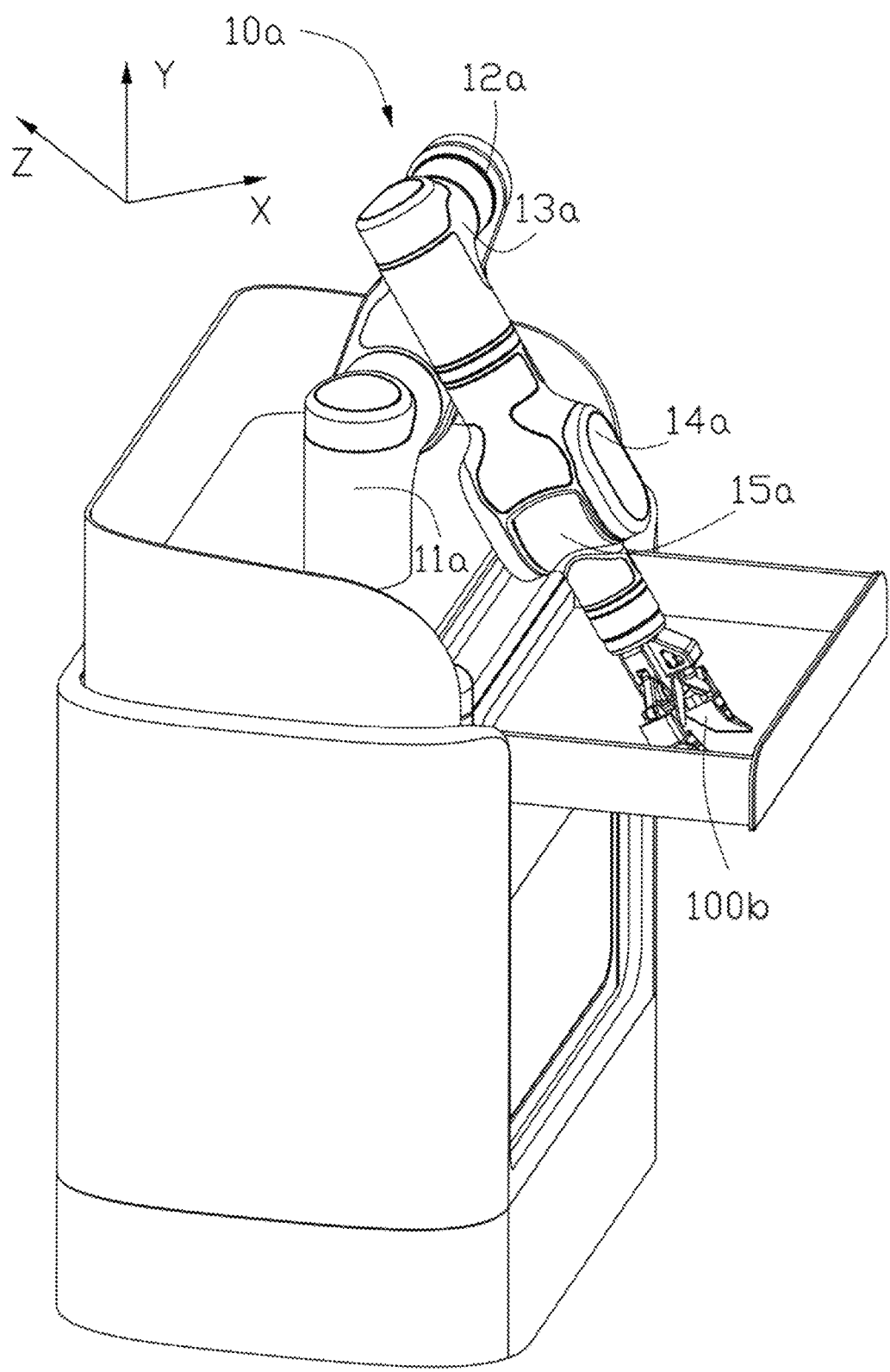
FIG. 4B is an isometric view of another embodiment of a mechanical arm, with an end effector reaching into a first workspace.

The storage units 310 may be slidable, with respect to a housing 320 of the movable platform 300, to partially/fully open positions (see FIG. 4B). In this partially/fully opened position, and as will be further explained in FIG. 24 and FIG. 25, the first link 11, the second link 12, and the third link 13 may be rotated in such a fashion that length of the fourth link 14 forms an angle with respect to an imaginary line running parallel to a heightwise direction of the moveable platform (called "a heading direction"). The mechanical arm 10 can vary rotation of the second link 12 and the third link 13, so as to cause the fourth link 14 to have a different heading direction. This allows the end effector (via attachment to the fifth link 15 or sixth link 16) to enter various areas of a workspace within a first storage drawer or multiple storage drawers if they are stacked. Of course it should be understood that reachability of the mechanical arm 10 within the workspaces within the storage drawers depends on the constraints imposed on the links of the mechanical arms (such as weight, payload, length) and angular displacement range of the associated revolute joints (e.g., joint range).

It should also be appreciated that the storage units 310 of the moveable platform 300 are slidable with respect to the housing 320 in an open position, a closed position, and a partially open position. This slidability of the storage units 310 between different positions means that the heading direction of the fourth link 14 has to also vary accordingly to let the end effector appropriately enter the workspaces within the storage units 310 without bumping into edges of the top surface and top edges of the storage units 310.

In one embodiment, the mechanical arm 10 includes a first revolute joint 161 that rotatably connects the first link 11 to the top surface 301 of the movable platform 300. The body 111 of the first link 11 may be hollow and receives the first revolute joint 161. The first revolute joint 161 enables the first link 11 to be rotatable about an axis of rotation orthogonal to the top surface 301 of the moveable platform 300. It should be appreciated that the term "revolute joint" is defined to be a one-degree-of-freedom kinematic pair used in mechanisms. Revolute joints provide single-axis rotation function used in many places such as folding mechanisms, and other uni-axial rotation devices. It should also be appreciated that other joints or rotating mechanisms can be used, such as ball joints or translational joints. For example, the arm or a portion of the arm can be driven by a timing belt or a cable that are actuated by motors configured remotely, or inside the links of the mechanical arm. In one embodiment, the first revolute joint 161 is configured to rotate in a range between ~180 to 180 degrees. It should be noted that the range of the angle of the first revolute joint 161 may change according to actual needs.

With reference to FIG. 2, in one embodiment, the second link 12 includes an elongated body 121 and two connection portions 122 and 123 that are fixed to opposite ends of the body 121. The mechanical arm further includes a second revolute joint 162 that rotatably connects the second link 12 to the connection portion 112 of the first link 11. The second revolute joint 12 is received in the first link 11. In one embodiment, the connection portion 122 may define a receiving space 1221, and an end of an output shaft of the second revolute joint 162 is fixed in the receiving space 1221, which enables the second link 12 to rotate about an axis of rotation orthogonal to the axis of rotation of the first link 11. It should be noted that the second revolute joint 162 may be arranged in the first link 11. The mechanical arm further includes a third revolute joint 163 that rotatably connects the third link 13 to the connection portion 123 of the second link 12. The third revolute joint 163 is received in the third link 13. In one embodiment, the connection portion 123 may define a receiving space 1231 and an end of an output shaft of the third revolute joint 163 is fixed in the receiving space 1231, which enables the third link 12 to rotate about an axis of rotation same as the axis of rotation of the end portion 123. In one embodiment, the second revolute joint 162 and the third revolute joint 163 are configured to rotate in a range between −180 to 180 degrees. It should be noted that the range of the angle of the second revolute joint 162 and the third revolute joint 163 may change according to actual needs.

With reference to FIL 2, in one embodiment, the third link 13 may be contoured and include an angled body 131 and a connection portion 132. One end of the angled body 131 is rotatably coupled to the connection portion 123 of the second link 12, and an opposite end is fixed to one end of the connection portion 132. The connection portion 132 extends in a direction that is substantially parallel to the extending direction of the second link 12, and toward the first link 11 when the mechanical arm 10 is in the folded state, as shown in FIG. 1. The mechanical arm 10 may further include a fourth revolute joint 164 that is received in the connection portion 132 of the third link 13. The fourth revolute joint 164 rotatably connects the fourth link 14 to the connection portion 132 of the third link 13. The fourth link 14 is rotatable about an axis of rotation orthogonal to the axis of rotation of the third link 13. In one embodiment, the fourth revolute joint 164 is configured to rotate in a range between −175 to 175 degrees. It should be noted that the range of the angle of the fourth revolute joint 164 may change according to actual needs.

With reference to FIGS. 2 and 3A, in one embodiment, the fourth link 14 may include a base 141 and two sidewalls 142 that protrude from the base 142 and are spaced apart from each other. The base is 141 is rotatably coupled to the end of the connection portion 132 of the third link 13 through the fourth revolute joint 164. The base 141 and the two side walls 142 define a receiving space 143, and the fifth link 15 is partly received in the receiving space 143. In one embodiment, the mechanical arm 10 may further include a fifth revolute joint 165 that is fixed to the fourth link 14. The fifth link 15 is rotatably coupled to the fourth link 14 through the fifth revolute joint 165. In one embodiment, the fifth revolute joint 165 is configured to rotate in a range between −90 to 90 degrees. It should be noted that the range of the angle of the fifth revolute joint 165 may change according to actual needs. For example, in another embodiment, the fifth revolute joint 165 is configured to rotate in a range between 0 to 179 degrees. It should be noted that the configuration of the fourth link 14 may change according to actual needs.

In one embodiment, the mechanical arm 10 includes a sixth revolute joint 166 that is received in the fifth link 15. The sixth revolute joint 166 has an axis of rotation that is orthogonal to an axis of rotation of the fifth link 15, and same as the axis of rotation of the fourth link 14. The end effector 100 is rotatably coupled to the fifth link 15 through the sixth revolute joint 166. In one embodiment, the sixth revolute joint 166 is configured to rotate in a range between −175 to 175 degrees. It should be noted that the range of the angle of the fifth revolute joint 165 may change according to actual needs. For example, in another embodiment, the fifth revolute joint 165 is configured to rotate in a range between 0 to 359 degrees. The fourth revolute joint 164, the fifth revolute joint 165, and the sixth revolute joint 166 form a ball joint, meaning the axes of rotation of the three revolute joints meet at one single point, which is beneficial for inverse kinematics.

In one embodiment, the maximum output torque, the nominal output torque, and the maximum output velocity of each of the six revolute joints of the mechanical arm 10 are shown in the table below. However, it should be noted that these parameters can change according to actual needs.

| Joints | Maximum Output Torque (NM) | Nominal Output Torque (NM) | Maximum Output Velocity (RPM) |
| --- | --- | --- | --- |
| First Revolute Joint | 115 | 55 | 30 |
| Second Revolute Joint | 115 | 55 | 30 |
| Third Revolute Joint | 45 | 20 | 40 |
| Fourth Revolute Joint | 45 | 20 | 40 |
| Fifth Revolute Joint | 15 | 8 | 10 |
| Sixth Revolute Joint | 15 | 8 | 10 |

Figure 4C:
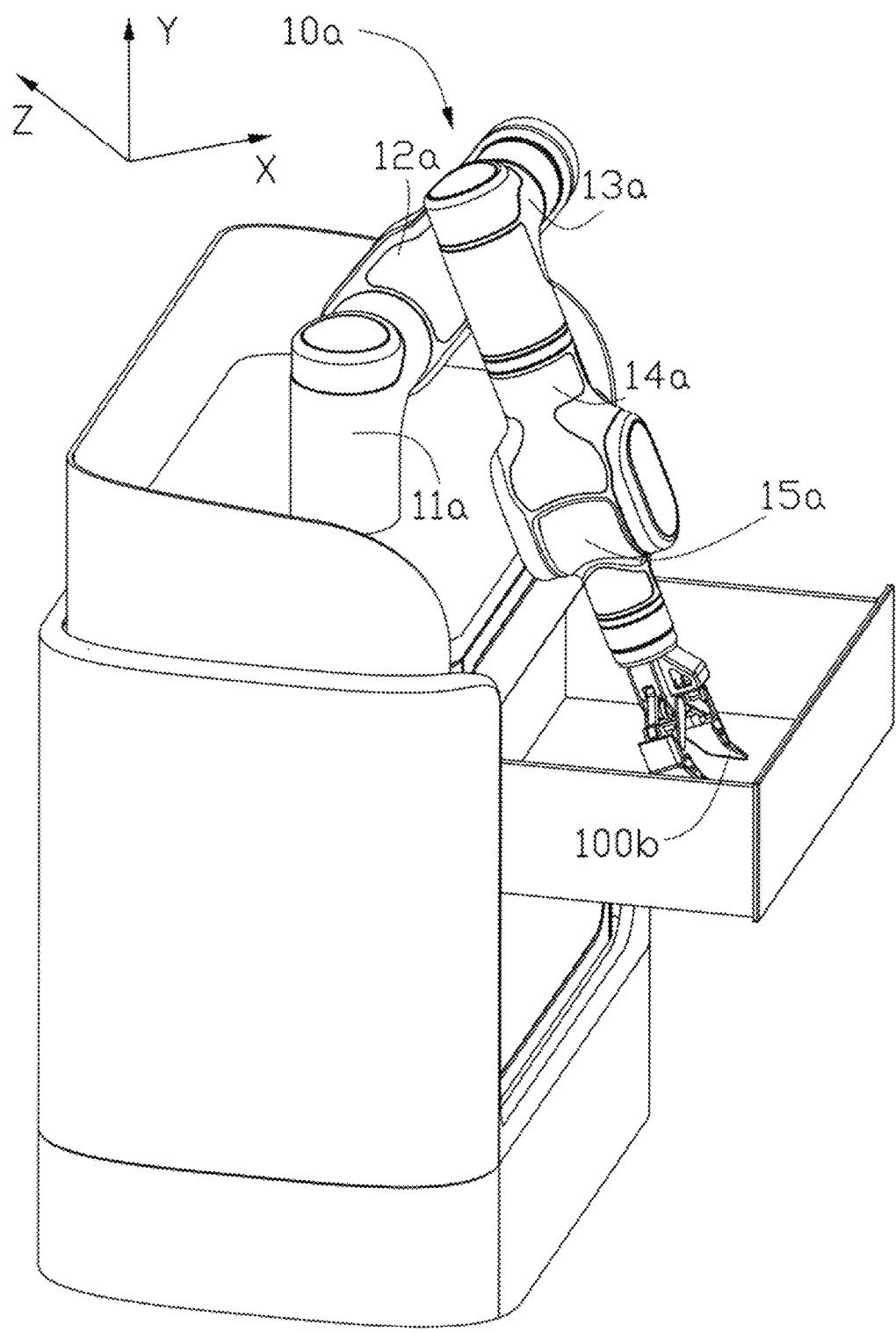
FIG. 4C is an isometric view of the mechanical arm of FIG. 4B, with the end effector reaching into a second workspace.
Figure 4D:
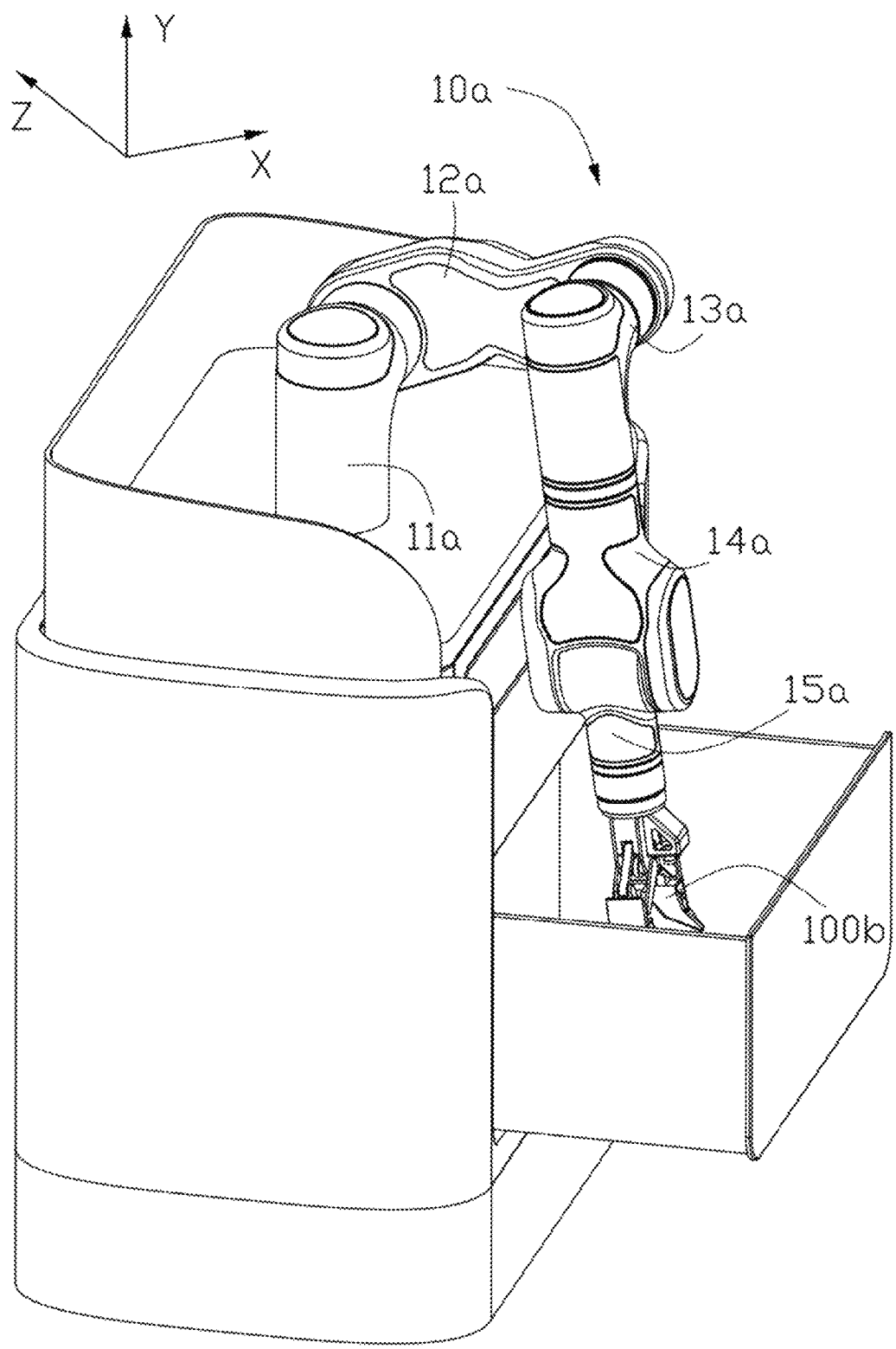
FIG. 4D is an isometric view of the mechanical arm of FIG. 4B, with the end effector reaching into a third workspace.
Figure 4E:
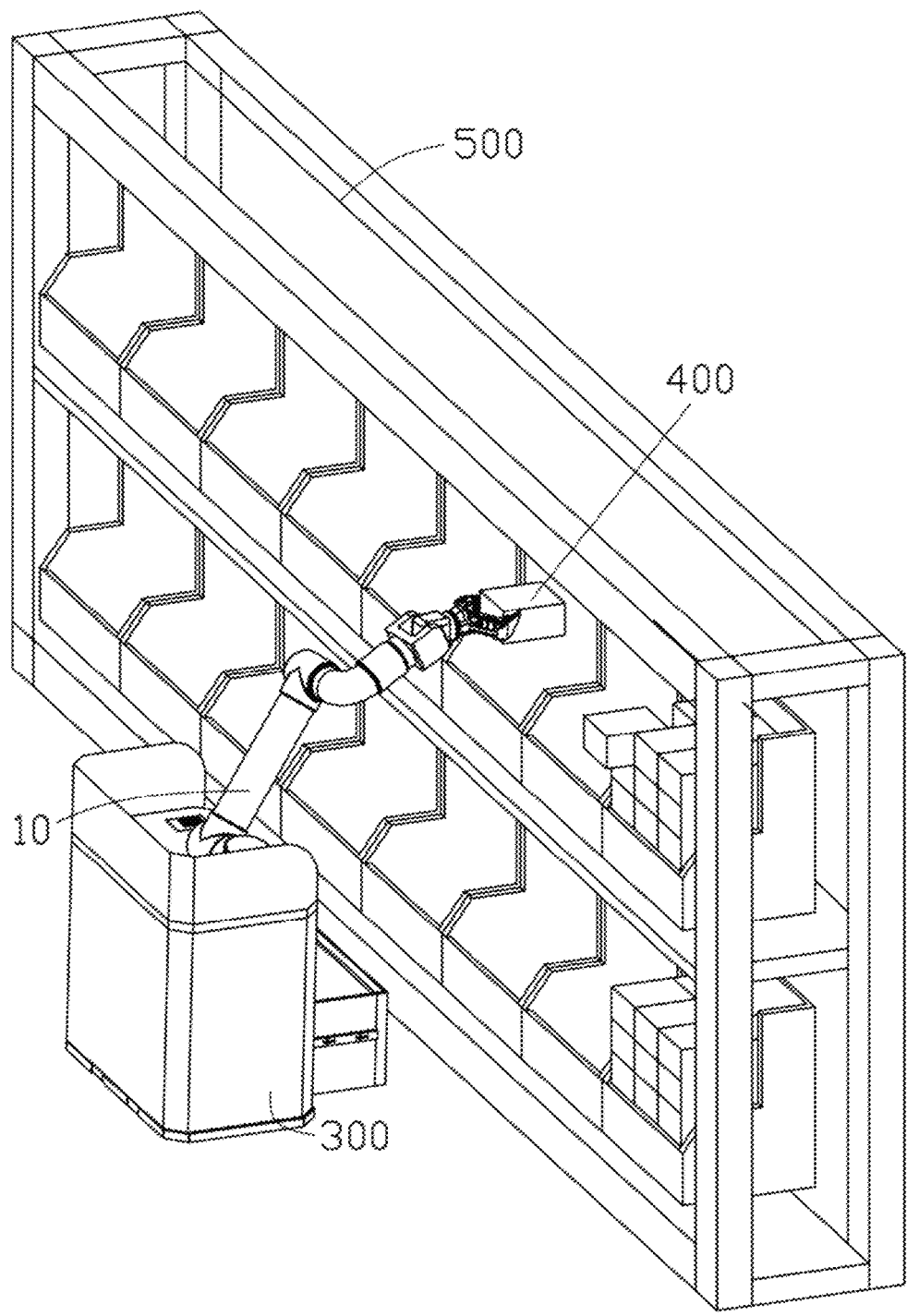
FIG. 4E shows the mechanical arm of FIG. 4A reaching up for an object on a shelf.

With such arrangement, the mechanical arm is able to meet desired payload requirement and perform the pick and place tasks. FIGS. 4B, 4C, and 4D show isometric views of another embodiment of a mechanical arm 10a have a configuration similar to the mechanical arm 10. Independent control of a first link 11a, a second link 12a, a third link 13a, a fourth link 14a, and a fifth link 15a allows for the mechanical arm 10a to actuate such that an end effector 100b is able to reach a first workspace, a second workspace, and a third workspace that are below and/or under the top surface 301. As shown in FIG. 4E, independent control of the first link 11, the second link 12, the third link 13, the fourth link 14, and the fifth link 15 allows for the mechanical arm 10 to reach up such that the end effector 110a is able to reach a workspace that is above the top surface 301.

Figure 5:
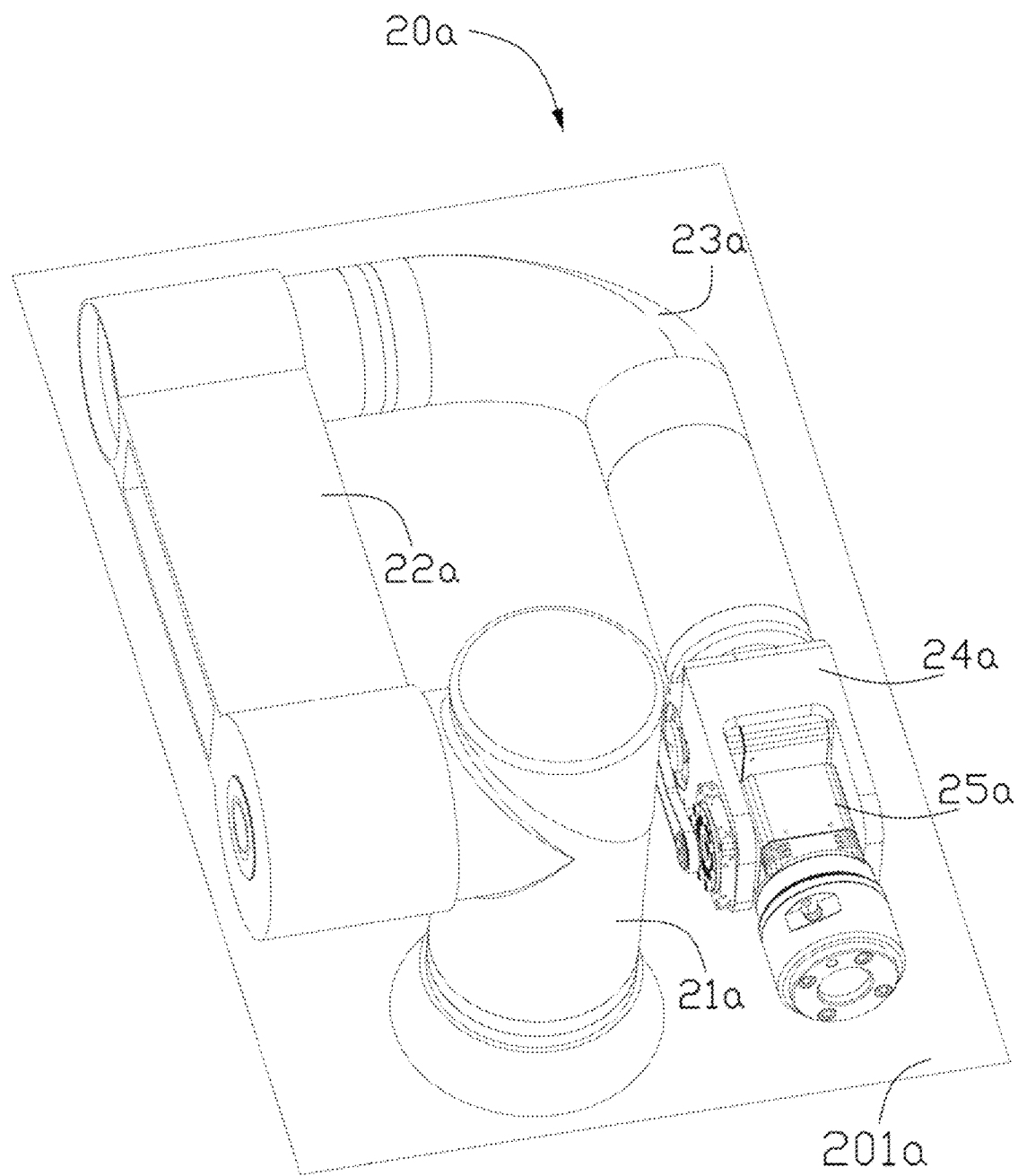
FIG. 5 is an isometric view of another embodiment of a mechanical arm in a folded state.
Figure 6:
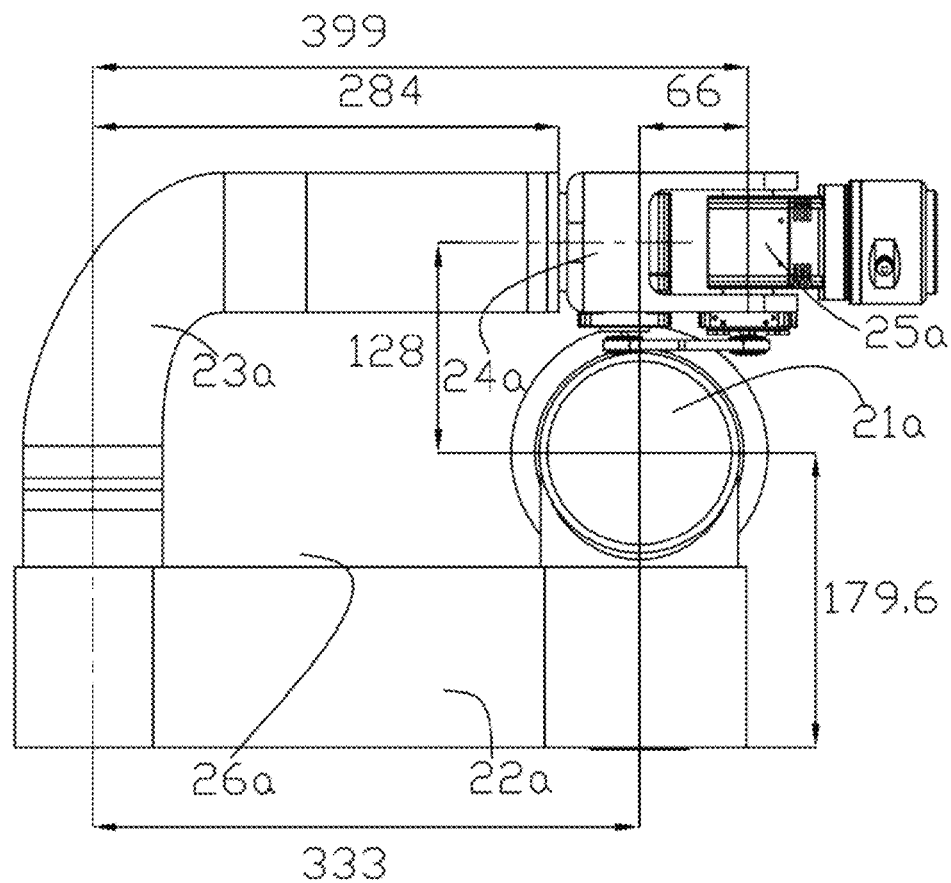
FIG. 6 is a planar view of the mechanical arm of FIG. 5.

FIG. 5 is an isometric view of another embodiment of a mechanical arm 20a, in a folded state, while FIG. 6 is a planar view of the mechanical arm of FIG. 5, which shows some exemplary dimensions, in millimeters, associated with the links of the mechanical arm 20a. The mechanical arm 20a has a configuration similar to the mechanical arm 10. In one embodiment, the mechanical arm 20a includes a first link 21a, a second link 22a, a third link 23a, a fourth link 24a, and a fifth link 25a. The first link 21a may also be referred to as joint module J12 because a first revolute joint and a second revolute joint are received in the first link 21a. The third link 23a may also be referred to as joint module J34 because a third revolute joint and a fourth revolute joint are received in the third link 23a. The fourth link 24a may also be referred to as joint module J5 because a fifth revolute joint is received in the fourth link 24a. The fifth link 25a may also be referred to as joint module J6 because a sixth revolute joint is received in the fifth link 25a. The first link 21a is connectable to a surface 201a, such as the top of a moveable platform. Opposite ends of the second link 22a are rotatably coupled to the first link 21a and the third link 23a, and opposite ends of the third link 23a are rotatably coupled to the second link 22a and the fourth link 24a. The fifth link 25a is rotatably coupled to the fourth link 24a. An effector (e.g., end effector 100a of FIG. 3A) is connectable to the fifth link 25a.

The first link 21a is rotatable about an axis of rotation that is orthogonal to the surface 201a. The second link 22a is rotatable about an axis of rotation orthogonal to the axis of rotation of the first link 21a. The third link 23a is rotatable about an axis of rotation same as an axis of rotation of one end of the second link 22a. The fourth link 24a is rotatable about an axis of rotation orthogonal to the axis of rotation of the third link 23a. The fifth link 25a is rotatable about an axis of rotation orthogonal to the axis of rotation of the fourth link 24a. The end effector is rotatable, together with an output shaft of the sixth revolute joint in the fifth link 25a, about an axis of rotation same as the axis of rotation of the fourth link 24a, and rotatable about an axis of rotation orthogonal to the axis of rotation of the fourth link 24a. The first link 21a, the second link 22a, the third link 23a, the fourth link 24a, and the fifth link 25a are collectively structured and configured to rotate, via joints, such that the end effector is actuatable to a workspace under the surface 201a. In a folded state as shown in FIG. 5, the second link 22a, the third link 23a, the fourth link 24a, and the fifth link 25a are substantially parallel to the surface 201a. In this folded state, the height of each of the second link 22a, the third link 23a, the fourth link 24a and the fifth link 25a, with respect to the surface 201a, is less than a height of the first link 21a with respect to the surface 201a. In another embodiment, height of each of at least the second link 22a and the third link 23a with respect to the surface 201a, is less than a height of the first link 21a with respect to the surface 201a.

In one embodiment, the fourth link 24a defines a U-shaped space to partly receive the fifth link 25a. The U-shaped space has an open end facing away from the third link 23a. However, in another embodiment, the configuration of the fourth link 24a may change. For example, the fourth link 24a may define a U-shaped space that has an open end facing the third link 23a. In the case, one end of the third link 23a is rotatably received in the U-shaped space.

Similar to the mechanical arm 10, the mechanical arm 20a may include a first revolute joint, a second revolute joint, a third revolute joint, a third revolute joint, a fourth revolute joint, a fifth revolute joint, and a sixth revolute joint. The first revolute joint is configured to rotatably connect the first link 21a to the surface 201a, and is received in the first link 21a. The second revolute joint is configured to rotatably connect the second link 22a to the side of the first link 21a, and may be received in an end of the first link 21a. The third revolute joint is configured to rotatably connect the third link 23a to a second end of the second link 22a, and is received in the one end of the third link 23a. The fourth revolute joint is configured to rotatably connect the fourth link 24a to one end of the third link 23a that is away from the second link 22a, and is received in an opposite end of the third link 23a. The fifth revolute joint is configured to rotatably connect the fifth link 25a to the fourth link 24a, and is received in the fourth link 24a. The sixth revolute joint is configured to rotatably connect the end effector to the fifth link 25a, and is received in the fifth link 25a. The fourth revolute joint, the fifth revolute joint, and the sixth revolute joint form a ball joint, meaning the axes of rotation of the three revolute joints meet at one single point, which is beneficial for inverse kinematics.

The links and the revolute joints of the mechanical arm 20a are arranged in a way similar to the links and the revolute joints of the mechanical arm 10, which allows the mechanical arm 20a to operate in the same manner as the mechanical arm 10. The following descriptions will focus on the difference between the two mechanical arms.

Compared to the third link 13 of the mechanical arm 10, the third link 23a has a similar configuration. The second link 22a, the third link 23a, and the fourth link 24a form a U-shaped void 26a in a folded state as shown in FIG. 6, which allows the fourth link 24a and the fifth link 25a, as a whole, to have a greater length, thereby enabling the mechanical arm 20a to have an extended reachability. Additionally, the fourth link 24a extends along an imaginary line that is offset from the first link 21a in the folded state. As a result, although being offset from the first link 21a, the end effector coupled to the fifth link 25a can be facing the first link 21a.

Figure 7:
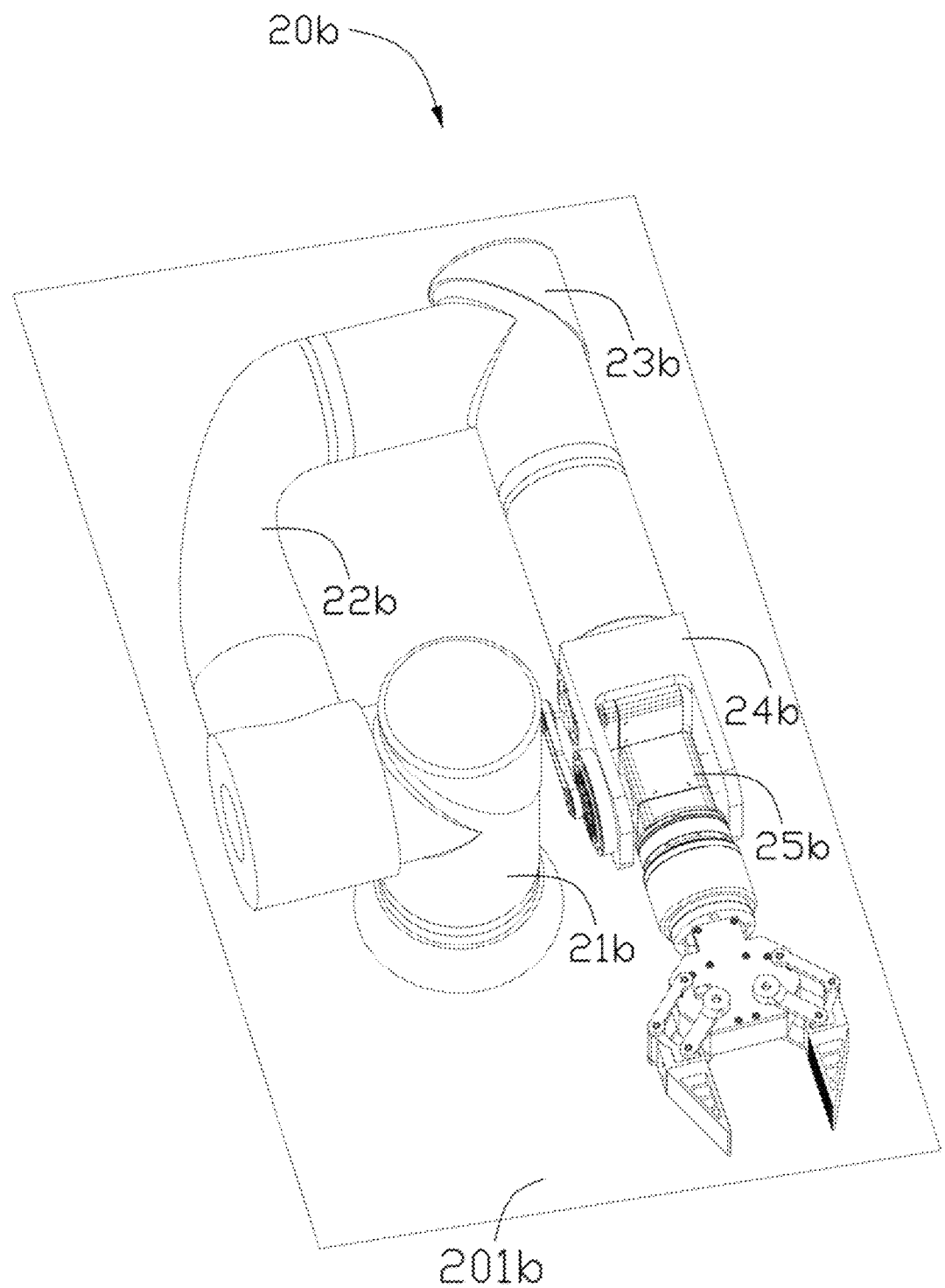
FIG. 7 is an isometric view of another embodiment of a mechanical arm in a folded state.
Figure 8:
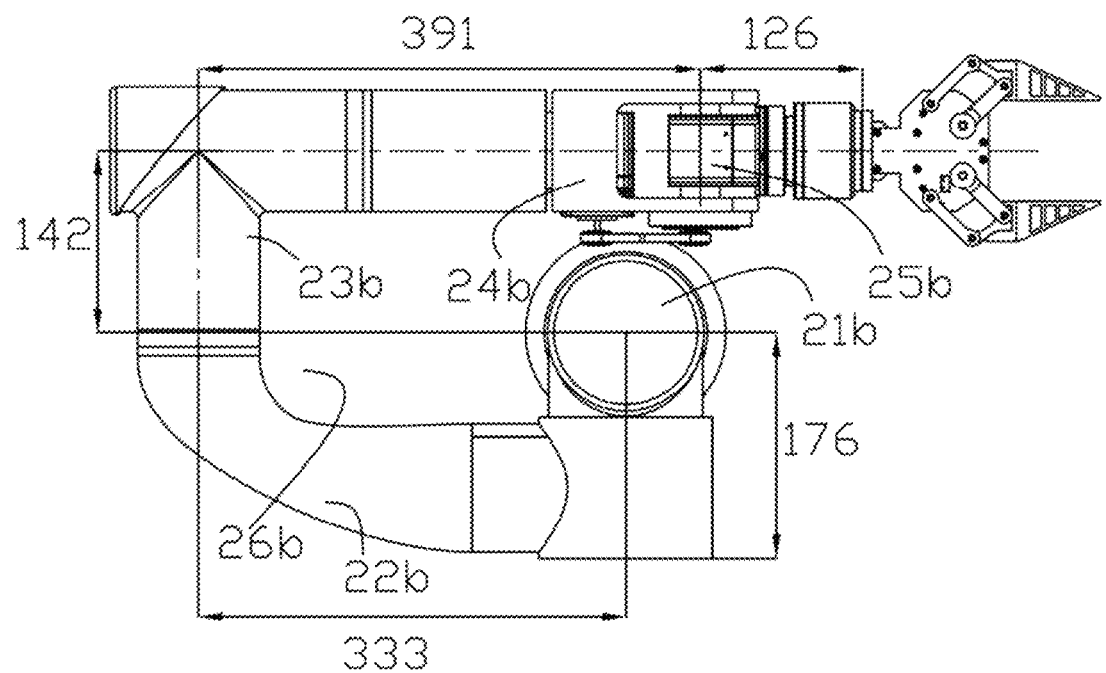
FIG. 8 is a planar view of the mechanical arm of FIG. 7.

FIG. 7 is an isometric view of another embodiment of a mechanical arm 20b, in a folded state, while FIG. 8 is a planar view of the mechanical arm of FIG. 7, which shows some exemplary dimensions, in millimeters, associated with the links of the mechanical arm 20b. The mechanical arm 20b has a configuration similar to the mechanical arm 20a. In one embodiment, the mechanical arm 20b includes a first link 21b, a second link 22b, a third link 23b, a fourth link 24b, and a fifth link 25b. The first link 21b may also be referred to as joint module J12 because a first revolute joint and a second revolute joint are received in the first link 21b. The third link 23b may also be referred to as joint module J34 because a third revolute joint and a fourth revolute joint are received in the third link 23b. The fourth link 24b may also be referred to as joint module J5 because a fifth revolute joint is received in the fourth link 24b. The fifth link 25b may also be referred to as joint module J6 because a sixth revolute joint is received in the fifth link 25b. The first link 21b is connectable to a surface 201b, such as the top of a moveable platform. Opposite ends of the second link 22b are rotatably coupled to the first link 21b and the third link 23b, and opposite ends of the third link 23b are rotatably coupled to the second link 22b and the fourth link 24b. The fifth link 25b is rotatably coupled to the fourth link 24b. An effector (e.g., end effector 100a of FIG. 3A) is connectable to the fifth link 25b.

The first link 21b is rotatable about an axis of rotation that is orthogonal to the surface 201b. The second link 22b is rotatable about an axis of rotation orthogonal to the axis of rotation of the first link 21b. The third link 23b is rotatable about an axis of rotation same as an axis of rotation of one end of the second link 22b. The fourth link 24b is rotatable about an axis of rotation orthogonal to the axis of rotation of the third link 23b. The fifth link 25b is rotatable about an axis of rotation orthogonal to the axis of rotation of the fourth link 24b. The end effector is rotatable about an axis of rotation same as the axis of rotation of the fourth link 24b, and rotatable about an axis of rotation orthogonal to the axis of rotation of the fourth link 24b. The first link 21b, the second link 22b, the third link 23b, and the fourth link 24b are collectively structured and configured to rotate, via joints, such that the end effector is actuatable to a workspace under the surface 201b. In a folded state as shown in FIG. 7, the second link 22b, the third link 23b, and the fourth link 24b are substantially parallel to the surface 201b. In this folded state, the height of each of the second link 22b, the third link 23b, the fourth link 24b and the fifth link 25b, with respect to the surface 201b, is less than a height of the first link 21b with respect to the surface 201b. In another embodiment, height of each of at least the second link 22b and the third link 23b, with respect to the surface 201b, is less than a height of the first link 21b with respect to the surface 201b.

Similar to the mechanical arm 20a, the mechanical arm 20b may include a first revolute joint, a second revolute joint, a third revolute joint, a third revolute joint, a fourth revolute joint, a fifth revolute joint, and a sixth revolute joint. The first revolute joint is configured to rotatably connect the first link 21b to the surface 201b, and is received in the first link 21b. The second revolute joint is configured to rotatably connect the second link 22b to the side of the first link 21b, and is received in an end of the first link 21b. The third revolute joint is configured to rotatably connect the third link 23b to an end of the second link 22a, and may be received in the second link 22b. The fourth revolute joint is configured to rotatably connect the fourth link 24b to one end of the third link 23b that is away from the second link 22b, and is received in the third link 23a. The fifth revolute joint is configured to rotatably connect the fifth link 25b to the fourth link 24b, and is received in the fourth link 24b. The sixth revolute joint is configured to rotatably connect the end effector to the fifth link 25b, and is received in the fifth link 25b. The fourth revolute joint, the fifth revolute joint, and the sixth revolute joint form a ball joint, meaning the axes of rotation of the three revolute joints meet at one single point, which is beneficial for inverse kinematics.

The links and the revolute joints of the mechanical arm 20b are arranged in a manner similar to the links and the revolute joints of the mechanical arm 20a, which allows the mechanical arm 20b to operate in a similar manner as the mechanical arm 20a. The following descriptions will focus on the difference between the two mechanical arms.

Compared to second link 22a of the mechanical arm 20a that extends along a substantially straight line, the second link 22b is contoured to include a connection portion 221b rotatably coupled to a side of the first link 21b, and an angled portion 222b having a first end fixed to the connection portion 221b, and an opposite second end rotatably coupled to the third link 23b. Shape of the third link 23b is also different from the third link 23a of the mechanical arm 20a. Specifically, the third link 23b includes two cylindrical portions that are rotatably coupled to the angled portion 222b and the fourth link 24b. Similar to the mechanical arm 20a, the second link 22b, the third link 23b, and the fourth link 24b form a U-shaped void 26b in a folded state as shown in FIG. 8. The fourth link 24h extends along an imaginary line that is offset from the first link 21b. As a result, although being offset from the first link 21b, the end effector coupled to the fifth link 25b can be facing the first link 21b.

Figure 9:
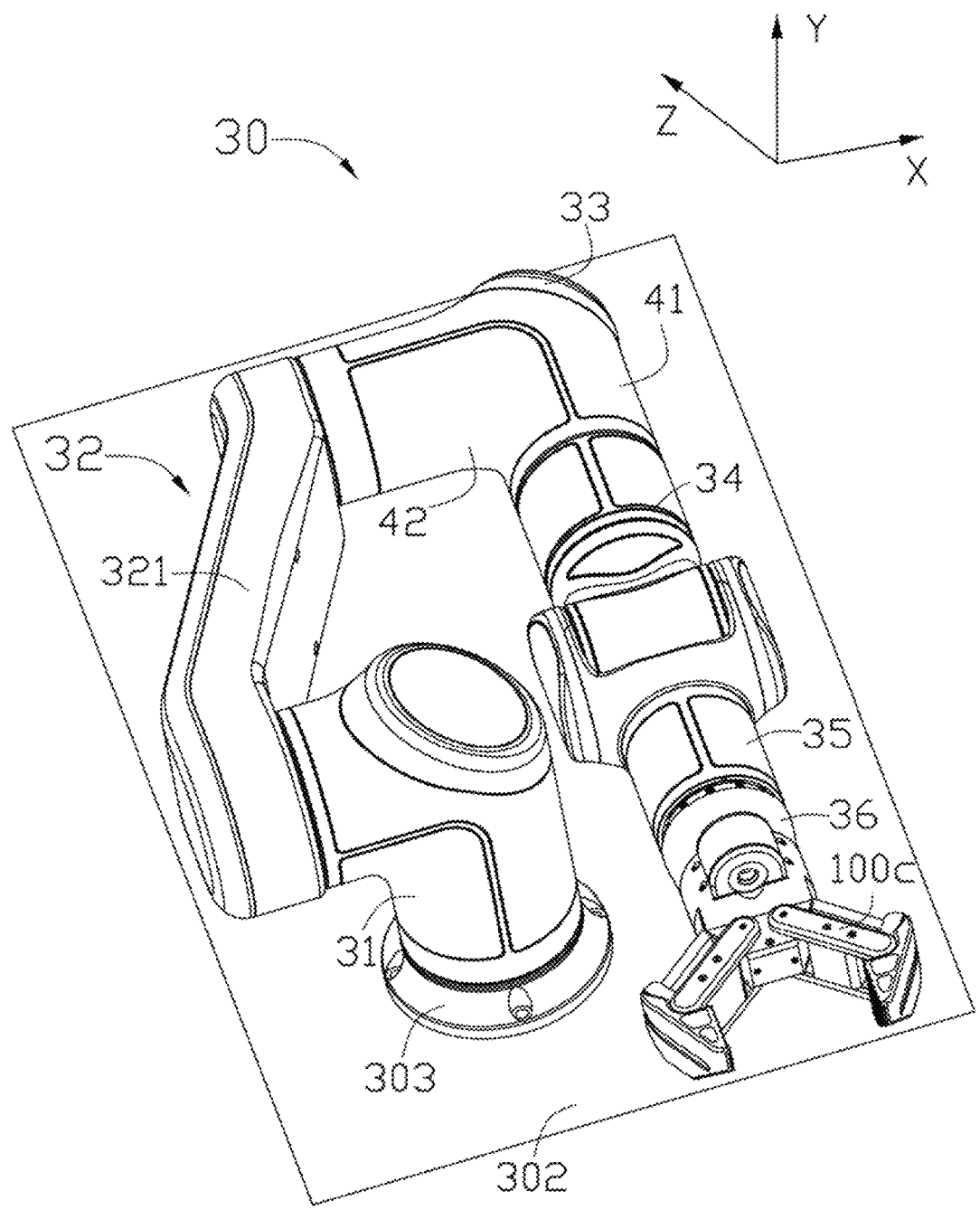
FIG. 9 is an isometric view of another embodiment of a mechanical arm in a folded state.

FIG. 9 is an isometric view of another embodiment of a mechanical arm 30 in a folded state. The mechanical arm 30 includes a first link 31, a second link 32, a third link 33, a fourth link 34, a fifth link 35, and an end effector 100c. The first link 31 may also be referred to as joint module J12 because a first revolute joint and a second revolute joint are received in the first link 31. The third link 33 may also be referred to as joint module J34 because a third revolute joint and a fourth revolute joint are received in the third link 33. The fourth link 34 may also be referred to as joint module J5 because a fifth revolute joint is received in the fourth link 34. The fifth link 35 may also be referred to as joint module J6 because a sixth revolute joint is received in the fifth link 35. The first link 31 is connectable to a surface 302, such as the top of a moveable platform. Opposite ends of the second link 32 are rotatably coupled to the first link 31 and the third link 33, and opposite ends of the third link 33 are rotatably coupled to the second link 32 and the fourth link 34. The fifth link 35 is rotatably coupled to the fourth link 34. The end effector 100c is connectable to the fifth link 35. The first link 31 is rotatable about an axis of rotation that is orthogonal to the surface 302. The second link 32 is rotatable about an axis of rotation orthogonal to an axis of rotation of the first link 31. The third link 33 is rotatable about an axis of rotation same as an axis of rotation of one end of the second link 32. The fourth link 34 is rotatable about an axis of rotation orthogonal to the axis of rotation of the third link 33. The end effector 100c is rotatable, together with an output shaft of the sixth revolute joint in the fifth link 35, about an axis of rotation same as the axis of rotation of the fourth link 34, and rotatable about an axis of rotation orthogonal to the axis of rotation of the fourth link 34. The first link 31, the second link 32, the third link 33, the fourth link 34, and the fifth link 35 are collectively structured and configured to rotate, via joints, such that the end effector 100c is actuatable to a workspace under the surface 302.

In a folded state as shown in FIG. 9, the second link 32, the third link 33, and the fourth link 34 are substantially parallel to the surface 302. It should be noted that the configuration of the mechanical arm 30 in the folded state can change according to actual needs. For example, the configuration of the mechanical arm 30 in the folded state may not be a perfect planar configuration, and the mechanical arm 30 can still be compact and stowed in a slightly different manner. In this folded state, height of each of the second link 32, the third link 33, the fourth link 34 and the fifth link 35, with respect to the surface 302, is less than a height of the first link 31 with respect to the surface 302. However, in another embodiment, height of each of at least the second link 32 and the third link 33 with respect to the surface 302, is less than a height of the first link 31 with respect to the surface 302. The fourth link 34 may be structured to extend along in the positive y-axis, so as to have a reduced distance between one end of the third link 33 away from the second link 32 and the end effector 100c. As a result, the fourth link 34 and the fifth link 35 may have a height slightly greater than the height of the first link 31.

The first link 31 has a limited height with respect to the surface 302 and provides support for the other links. The first link 31 is rotatably coupled to the surface 302 and includes a joint (e.g., revolute joint) for rotatably connecting the first link 31 to the surface 302 and electronic components associated with the revolute joint. The second link 32 is coupled to a side of the first link 31 such that the second link 32 is rotatable about an axis of rotation orthogonal to the axis of rotation of the first link 31. The second link 32 may be elongated such that rotation of the first link and the second link 32 allows the mechanical arm 30 to have an extended reachability.

Shape of the third link 33 may be contoured to have a portion that extends in a direction that is orthogonal to the axis of rotation of the third link 33. As a result, the first link 31, the second link 32 and the third link 33 are structured and configured to actuate in such a way that allows for the first link 31, the second link 32 and the third link 33 to be in the folded state, such as being parallel to (i.e., planar to) the surface 302.

The fourth link 34 is rotatable about an axis of rotation orthogonal to the axis of rotation of the third link 33. The fifth link 35 is rotatable about an axis of rotation orthogonal to the axis of rotation of the fourth link 34. The first link 31, the second link 32, third link 33, the fourth link 34, and the fifth link 35 are configured to actuate to a workspace on a side and below and under the surface 302. This allows the end effector 100c to perform pick and place operations inside an internal workspace of storage units of a movable platform or the space above the surface 302. Rotational movement of the links of the mechanical arm 30 allows the end effector 100c to be in a determined pose for a specific object.

Figure 10:
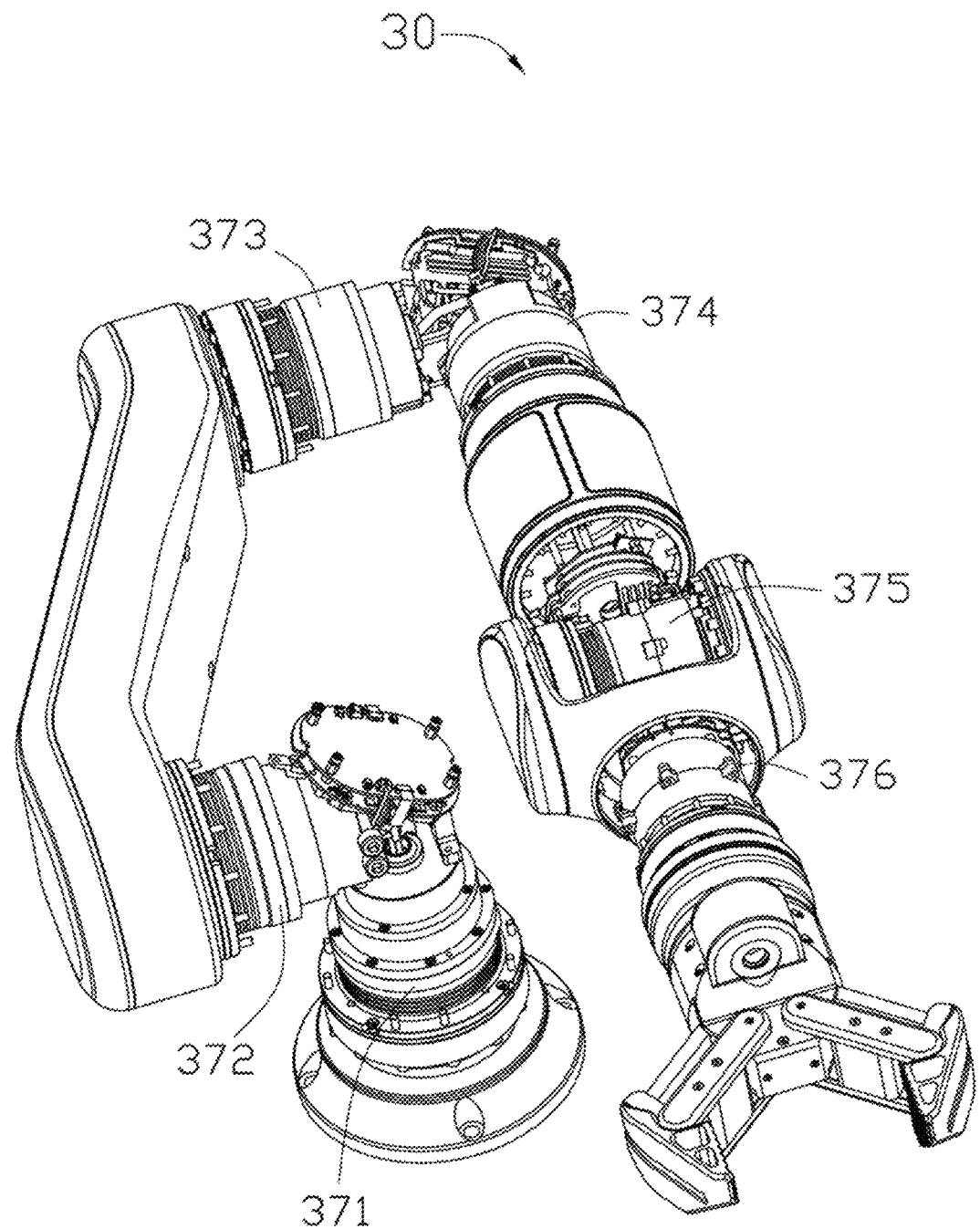
FIG. 10 is similar to FIG. 9, with certain components removed.
Figure 11:
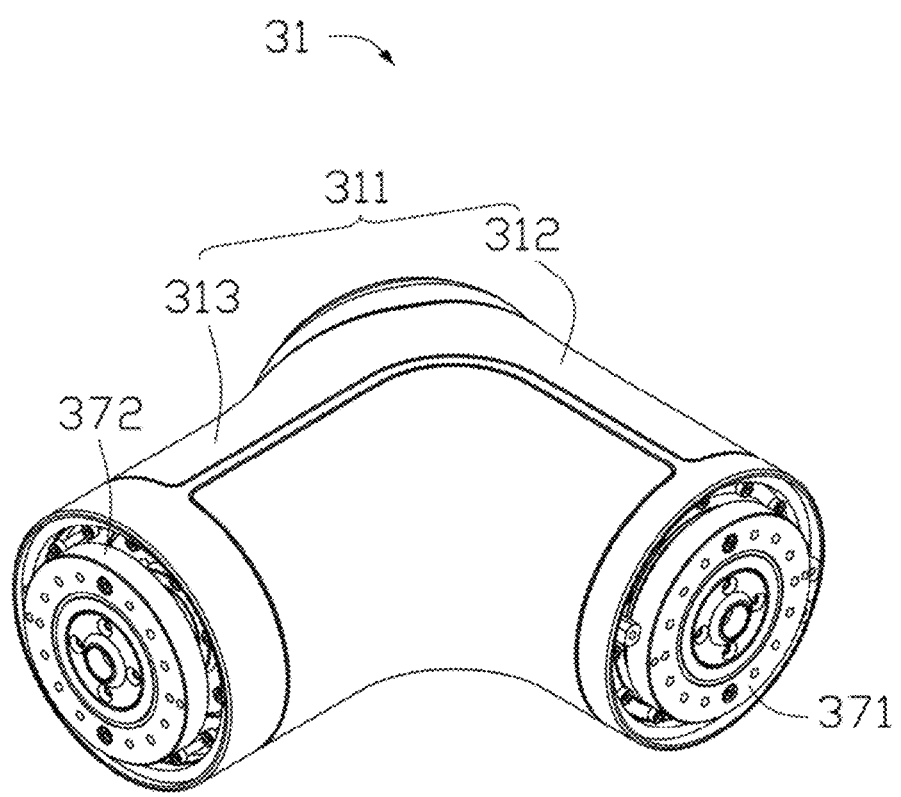
FIG. 11 is an isometric view of a first link of the mechanical arm according to one embodiment.

With reference to FIGS. 10 and 11, in one embodiment, the mechanical arm 30 includes a first revolute joint 371 that is configured to rotatably connect the first link 31 to the surface 302, and a second revolute joint 372 that is configured to rotatably connect the second link 32 to the first link 31. In one embodiment, the first link 31 is a dual-joint module that incorporates the first revolute joint 371 and the second revolute joint 372. Specifically, the first revolute joint 371 and the second revolute 372 are received in the first link 31 at two ends of the first link 31. In one embodiment, the first revolute joint 371 and the second revolute joint 372 are chosen to have relatively large output torque such that the mechanical arm 30 can have a relatively large payload (i.e., the weight the mechanical arm 30 can lift when fully extended). Compared to the arrangement where two revolute joints are separately disposed in two different links, the dual-joint module J12 makes full use of the internal space of the first link 31, allowing the dual-joint module J12 to be compact without compromising payload performance. Additionally, the dual-joint module J12, serving as a modular actuating component, allows for the mechanical arm 30 to adapt to different applications without significant re-design. For example, the dual-joint module J12 of the mechanical arm 30 may be removed and replaced with a different dual-joint module J12 having different output torque, enabling the mechanical arm 30 to adapt to different payload scenarios.

In one such exemplary payload scenario, the mechanical arm 10 may be employed in a hospital environment where links of the mechanical arm can be actuated to pick up a hospital tray with food (such as a plate with cover, meat, pasta, soup, pudding, fruit, etc.) from the moveable platform 300 (e.g., shelves of the moveable platform 300) via an end effector, where the total weight of the food and tray, along with the weight of the end extender, camera, and other items, may be around 5 kg. The mechanical arm 10 may then actuate the links to a different position, such that the end effector delivers the hospital tray on a bed table of a patient. During this process, the large output torque and specific configuration and shape of the dual-joint module J12 greatly assists in lifting and delivering the relatively heavy hospital tray with food.

Figure 12:
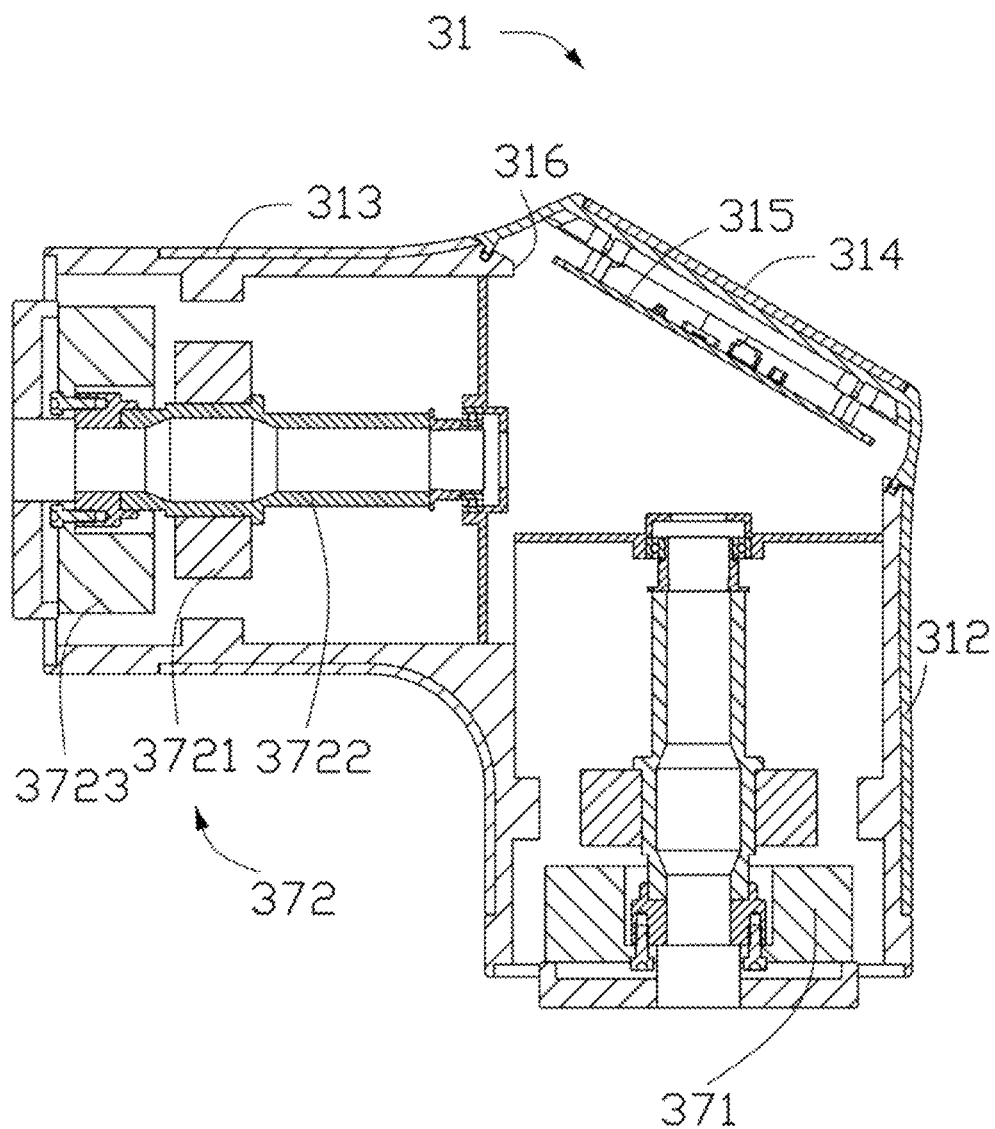
FIG. 12 is a planar cross-sectional view of the first link of FIG. 11.

With reference to FIGS. 11 and 12, in one embodiment, the first revolute joint 371 and the second revolute joint 372 are substantially orthogonal to each other. Specifically, the first link 31 includes a housing 311 that defines a hollow space to the receive the first revolute joint 371 and the second revolute joint 372. The housing 311 may include a first portion 312 and a second portion 313 that are hollow and are substantially orthogonal to each other. The first portion 312 and the second portion 313 are coupled to each other and are in electronic communication with each other. The first revolute joint 371 is received in the first portion 312, and the second revolute joint 372 is received in the second portion 313. As a result, the axes of rotation of the output shafts of the first revolute joint 371 and the second revolute joint 372 are substantially orthogonal to each other, which results in that the first link 31 is rotatable about an axis of rotation orthogonal to the axis of rotation of the second link 32. As shown in FIG. 11, output discs of the first revolute joint 371 and the second revolute joint 372, which will be explained in detail below, are external to the first portion 312 and the second portion 313 and adjacent to open ends of the first portion 312 and the second portion 313. The output disc of the first revolute joint 371 may be fixed to a base 303 (see FIG. 9) that is fixed to the surface 302, so as to rotatably connect the first link 31 to the surface 302. The output disc of the second revolute joint 371 is fixed to the second link 32 so as to rotatably connect the second link 32 to the first link 31.

In one embodiment, the first link 31 further includes a circuit board 315 for driving the first revolute joint 371 and the second revolute joint 372. The housing 311 defines an opening 316 proximate to the ends of the first revolute joint 371 and the second revolute joint 372 opposite the output discs of the first revolute joint 371 and the second revolute joint 372. The first link 31 further includes a cover 314 that covers the opening 316. The cover 314 is angled with respect to the axis of rotation of the first link 31 and the axis of rotation of the second link 32. The circuit board 315 is fixed to the cover 314. As a result, the circuit board 315 is angled with respect to the axis of rotation of the first link 31 and the axis of rotation of the second link 32. Such arrangement can make full use of the space where the first portion 312 joins the second portion 313 and make for easy access to the circuit board 315 when needed.

Figure 13:
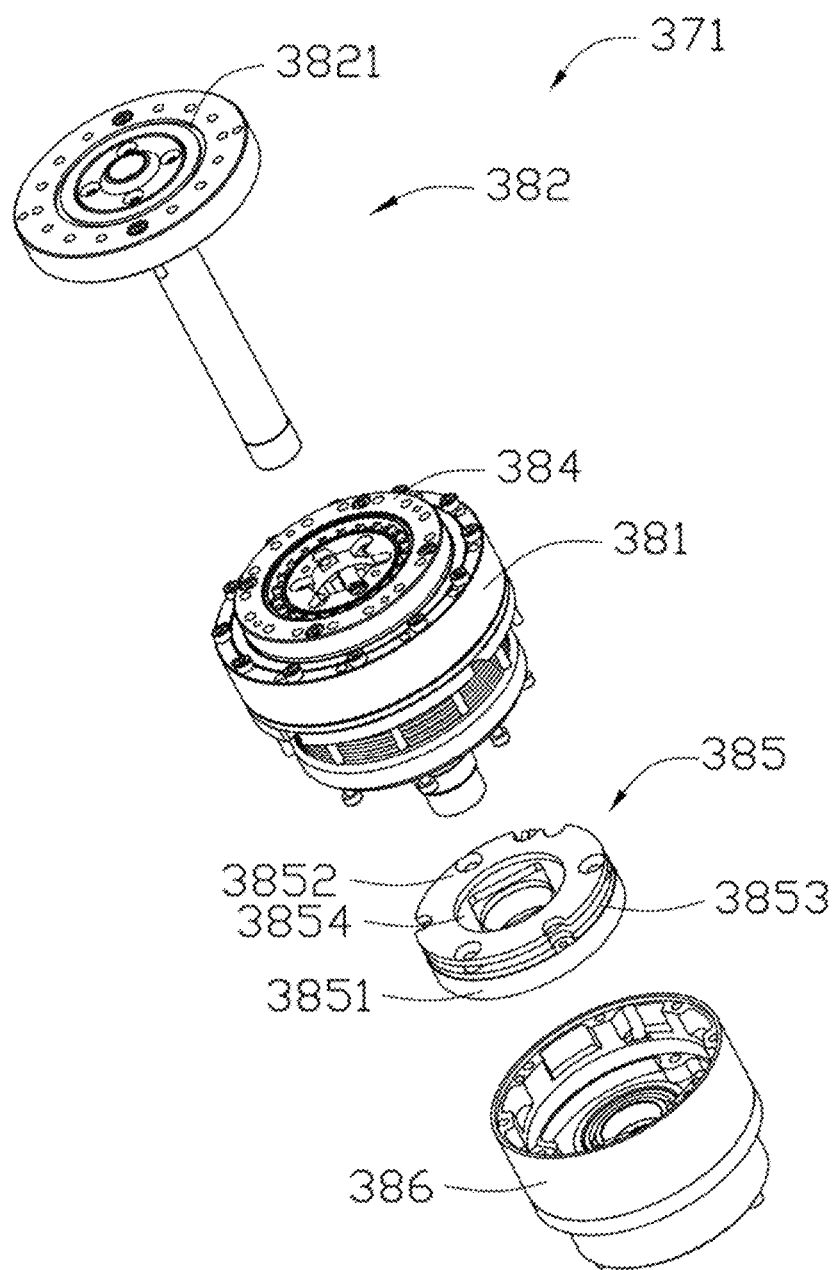
FIG. 13 is an isometric exploded view of a first revolute joint of the mechanical arm according to one embodiment.
Figure 14:
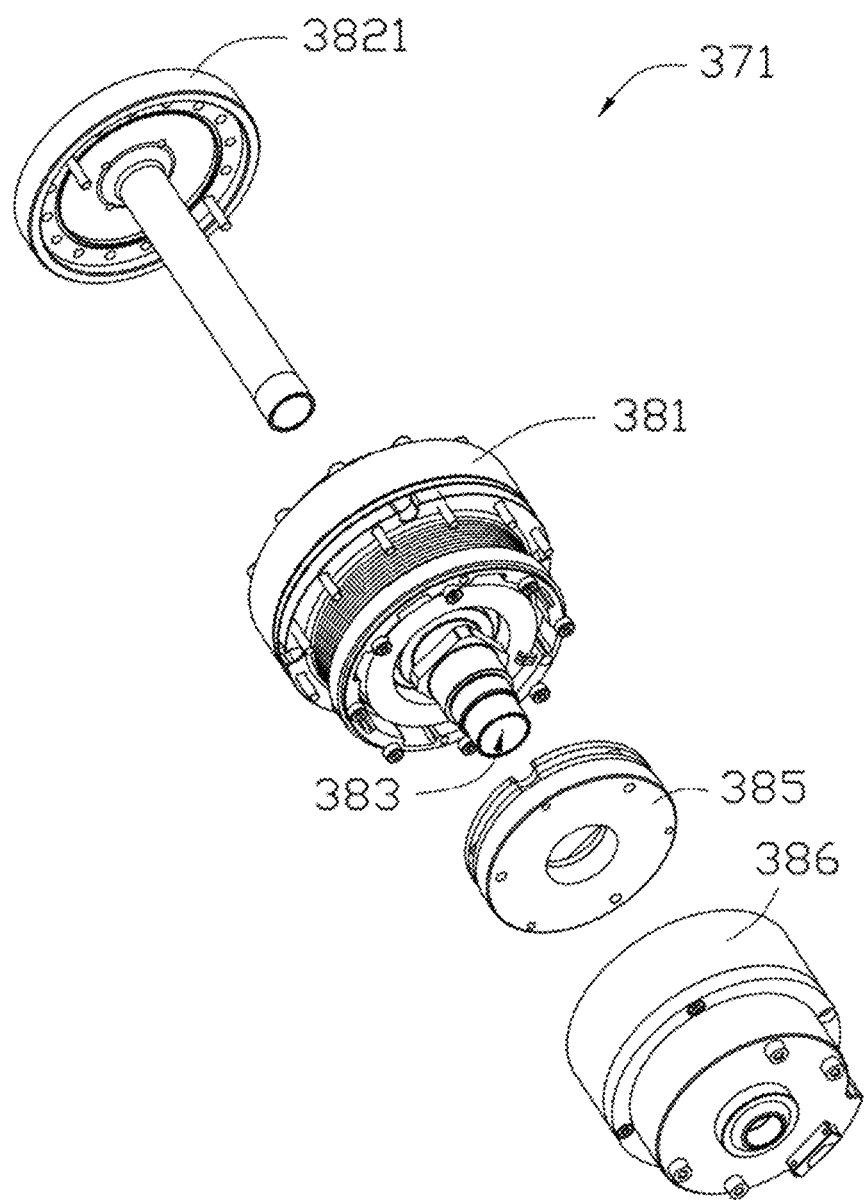
FIG. 14 is similar to FIG. 13, but viewed from a different perspective.

The first revolute joint 371 and the second joint 372 can have the same or similar configuration. For example, as shown in FIG. 12, each of the first revolute joint 371 and the second joint 372 may include a motor 3721, a hollow shaft 3722, and a harmonic drive 3723. It should be noted that FIG. 12 shows only certain components of the first revolute joint 371 and the second joint 372, and other components are omitted for clarity. With reference to FIGS. 13 and 14, in one embodiment, the first revolute joint 371 is a servo that uses a direct current (DC) motor with built in gearing and feedback control loop circuitry. In one embodiment, the first revolute joint 371 includes a servo body 381 and an output flange 382. The servo body 381 may include a stator and a rotor that is rotatable with respect to the stator. A rotating shaft 383 is fixed to and rotatable together with the rotor. The servo body 381 may further include a speed reducer 384 (e.g., a harmonic drive) coupled to the rotating shaft 383. The output flange 382 includes an output disc 3821 that is fixed to and rotatable together with an output member (e.g., a flex spline of a harmonic drive) of the speed reducer 384. The output disc 3821 is fixed to the base 303 (see FIG. 9) that is fixed to the surface 302, which rotatably connects the first link 31 to the surface 302.

In one embodiment, the mechanical arm 30 further includes a number of brakes mated to corresponding revolute joints in the first link 31, the second link 32, the third link 33, and the fourth link 34, and fifth link 35 and are configured to selectively stop movement of the mechanical arm 30 so as to hold the mechanical arm 30 in a determined pose. In one embodiment as shown in FIGS. 13 and 14, a brake 385 is coupled to the servo body 381 of the first revolute joint 371. Specifically, the first revolute joint 371 includes a brake holder 386 fixed to the servo body 381, and the brake 385 is fixed to the brake holder 386. In one embodiment, the brake 385 may be a non-excited electromagnetic brake. The brake 385 includes a main body 3851, a fixed plate 3852 fixed to the main body 3851, a movable plate 3853 movably coupled to the main body 3851 through a number of springs, and a friction plate 3854 fixed to and rotatable together with the rotating shaft 383 and sandwiched between the movable plate 3853 and the fixed plate 3852. The main body 3851 includes therein coils that can create a magnetic field that attracts the movable plate 3883 to abut against the main body 3851, which compresses the springs. When the first revolute joint 371 is de-energized, no current/voltage is applied to the coils, and the springs rebounds and pushes the movable plate 3853, which in turn pushes the friction plate 3854 to abut tightly against the fixed plate 3852. Then, frictional clamping force is transferred to the rotating shaft 383 through the friction plate 3854, which stops rotation of the rotating shaft 383 and hold the rotating shaft 383 in place. The first link 31 is thus held in position by the brake 385. It should be noted that the brake 385 is not limited to the spring-actuated non-excited electromagnetic brake, and other types of brakes may be used according to actual needs, such as spring engaged tooth brakes.

The second revolute joint 372 may have a configuration similar to or same as the first revolute joint 371, which will not be repeated here.

With reference again to FIG. 9, in one embodiment, the second link 32 has an elongated body defining a first end and an opposite second end, and the first end is rotatable about an axis of rotation orthogonal to an axis of rotation of the first link 31. In one embodiment, the second link 32 may be designed according to a topology based FEA simulation to have an optimized form which can maintain the rigidity with less weight/materials. Specifically, an angled portion 321 of the second link 32 is angled with the first end and the second end of the second link 32. Such arrangement allows for the second link 32 to have a relatively small mass with a high rigidity, which, in conjunction with the joints of the mechanical arm 30, enables the mechanical arm 30 to have a relatively large payload.

With reference again to FIGS. 9 and 10, the mechanical arm 30 further includes a third revolute joint 373 and a fourth revolute joint 374. The third link 33 is rotatably coupled to the second link 32 through the third revolute joint 373. The fourth revolute joint 374 is configured to rotatably connect the fourth link 34 to the third link 33. The third revolute joint 373 and the fourth revolute joint 374 are received in the third link 33 at two ends of the third link 33. Similar to the first link 31, the third link 33 is a dual-joint module that incorporates the third revolute joint 373 and the fourth revolute joint 374. In one embodiment, the third revolute joint 373 and the fourth revolute joint 374 are chosen to have relatively large output torque such that the mechanical arm 30 can have a relatively large payload. Compared to the arrangement that two revolute joints are separately disposed in two different links, the arrangement of the dual-joint module J34 makes full use of the internal space of the third link 33, allowing the dual-joint module J34 to be compact without compromising payload performance. Additionally, the dual-joint module J34 serving as a modular actuating component facilitates serviceability and allows for the mechanical arm 30 to adapt to different applications without significant re-design. The arrangement of the dual-joint module J34 allows for less electronics footprint and less wiring running/routing.

The third link 33 may be structured in a way similar to or same as the first link 31, and the third revolute joint 373 and fourth revolute joint 374 each may have a configuration similar to or same as the first revolute joint 371. For example, the third link 33 may include a first portion and a second portion that are coupled to and are orthogonal to each other. The third revolute joint 373 is received in the first portion and the fourth revolute joint 374 is received in the second portion, which allows the third revolute joint 373 to output a rotational movement about an axis of rotation orthogonal to an axis of rotation of rotational movement outputted by the fourth revolute joint 374. As a result, the fourth link 34 is rotatable about an axis of rotation orthogonal to the axis of rotation of the third link 33. Details can be referred to the descriptions above in relation to the first link 31, the first revolute joint 371, and the second revolute joint 372, and will not be repeated here.

Figure 15:
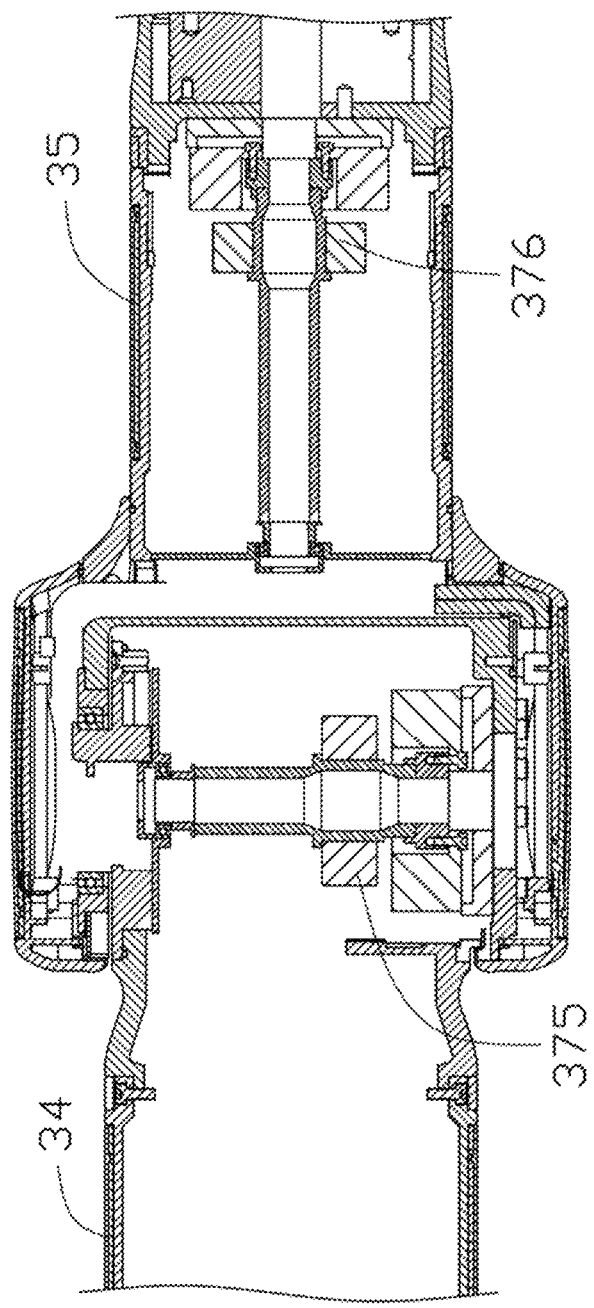
FIG. 15 is a cross-sectional view of a fourth link coupled to a fifth link of the mechanical arm.

With reference to FIG. 15, in one embodiment, the fifth link 35 is rotatably coupled to the fourth link 34 through a fifth revolute joint 375, and is rotatable about an axis of rotation orthogonal to the axis of rotation of the fourth link 34. The mechanical arm 30 further includes a sixth revolute joint 376 that outputs a rotational movement about an axis of rotation orthogonal to the axis of rotation of the rotational movement outputted by the fifth revolute joint 375. The sixth revolute joint 376 is received in the fifth link 35. The end effector 100c may be coupled to the fifth link 35 through the sixth revolute joint 376. The single joint modules J5 and J6 output rotational movement about two axes that are orthogonal to each other. The fifth revolute joint 375 and sixth revolute joint 376 each may have a configuration similar to or same as the first revolute joint 371. Details can be referred to the descriptions above in relation to the first revolute joint 371, and will not be repeated here. The fourth revolute joint 374, the fifth revolute joint 375, and the sixth revolute joint 376 form a ball joint, meaning the axes of rotation of the three revolute joints meet at one single point, which is beneficial for inverse kinematics. It should be noted that FIG. 15 shows only certain components of the fifth revolute joint 375 and the sixth revolute joint 376, and other components are omitted for clarity.

Figure 16:
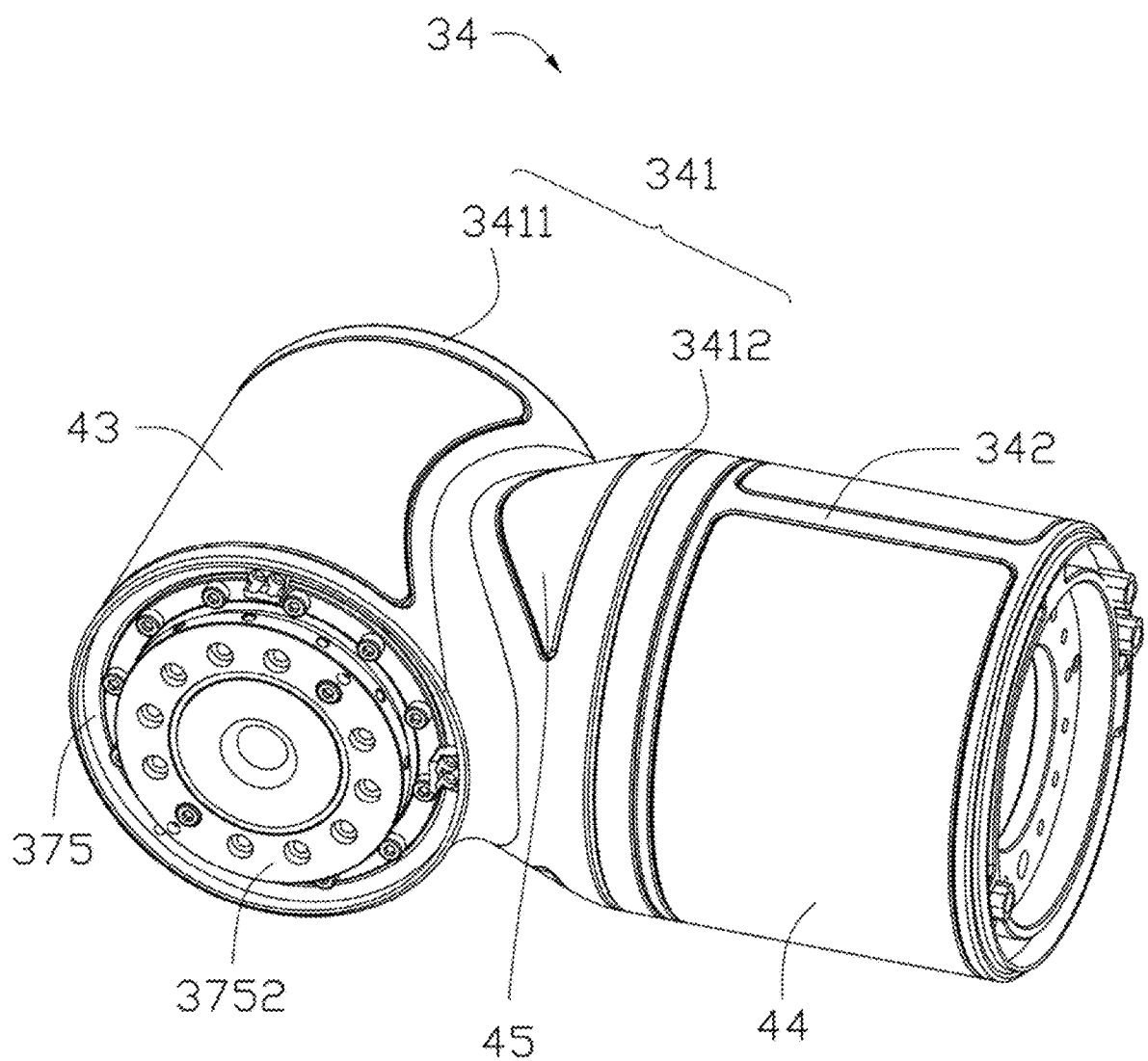
FIG. 16 is an isometric view of a fourth link of the mechanical arm according to one embodiment.

With reference FIG. 16, in one embodiment, the fourth link 34 includes a joint receiving member 341 and a connecting member 342 that are coupled to each other. The joint receiving member 341 includes a main body 3411 and a connection portion 3412 protruding from the lateral surface of the main body 3411. The main body 3411 and the connection portion 3412 are both hollow and in communication with each other. The fifth revolute joint 375 is received in the main body 3411, and electronic components (e.g., an encoder, a circuit board, and cables) associated with the fifth revolute joint 375 are received in the connection portion 3412. An output disc 3752 of the fifth revolute joint 375 is external to the main body 3411 adjacent to an open end 3413 of the main body 3411. The fifth link 35 is coupled to the output disc of the fifth revolute joint 375, and is thus rotatably coupled to the fourth link 34. The connecting member 342 is rotatably coupled to the third link 33 through the fourth revolute joint 374.

Figure 17:
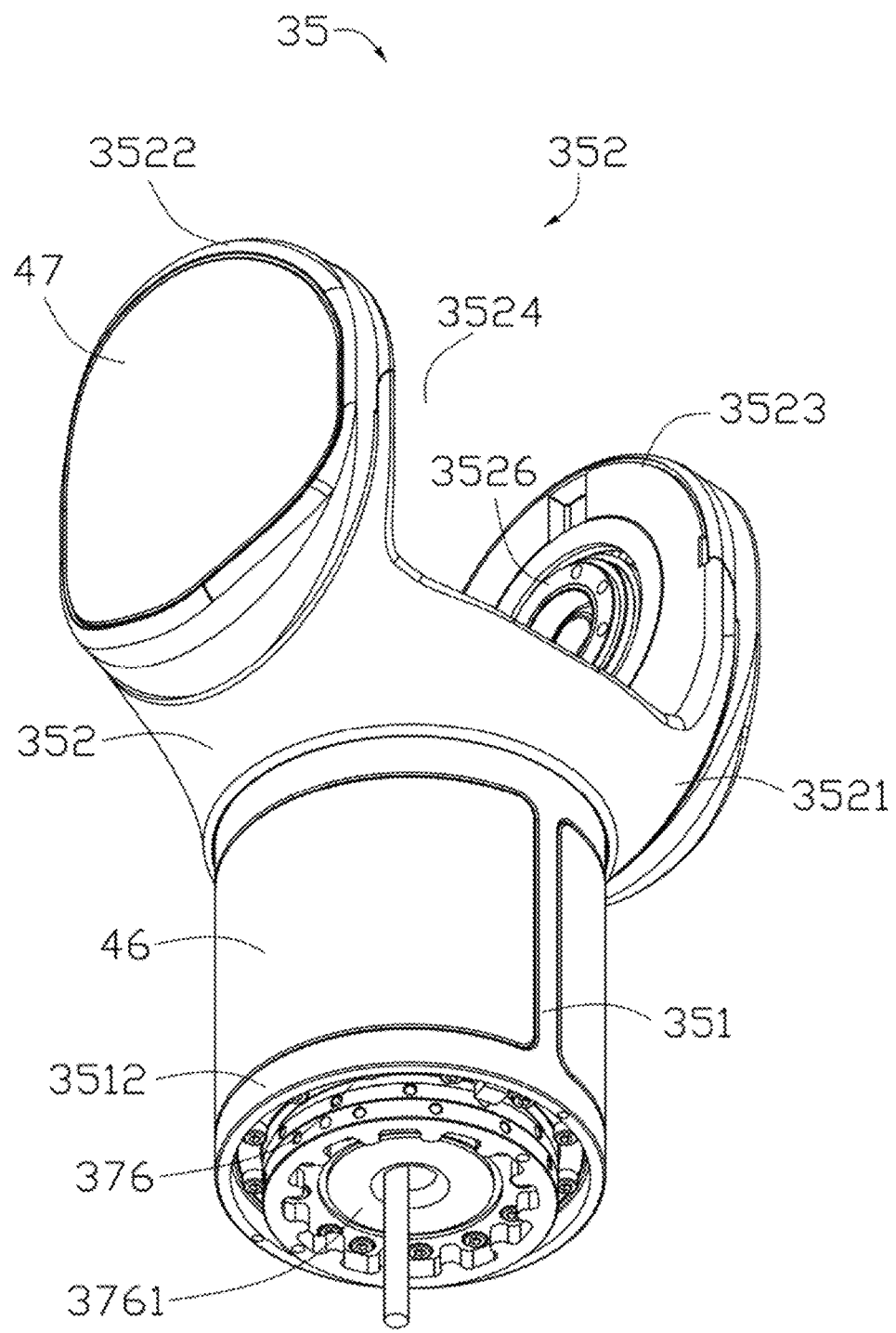
FIG. 17 is an isometric view of a fifth link of the mechanical arm according to one embodiment.

With reference to FIG. 17, in one embodiment, the fifth link 35 includes a joint receiving member 351 and a connecting member 352 that are coupled to each other. The joint receiving member 351 is hollow and includes a first end fixed to the connecting member 352, and a second end 3512. The sixth revolute joint 376 and electronic components (e.g., an encoder, a circuit board, and cables) associated with the six revolute joint 376 are received in the joint receiving member 351, with the output disc 3761 of the sixth revolute joint 376 located adjacent to the second end 3512. The end effector 100c may be fixed to the output disc 3761 of the sixth revolute joint 376. The end effector 100c is thus rotatable about an axis of rotation same as the axis of rotation of the fourth link 34, and is rotatable about an axis of rotation orthogonal to the axis of rotation of the fifth link 35.

In one embodiment, the connecting member 352 includes a base member 3521 and two side members 3522 and 3523 that are coupled to base member 3521 and spaced apart from each other. The base member 3521 and the two side members 3522 and 3523 define a U-shaped space 3524, and the joint receiving member 341 of the fourth link 34 is received in the U-shaped space 3524. The output disc 3752 of the fifth revolute joint 375 is fixed to the side member 3522, thereby rotatably connecting the fifth link 35 to the fourth link 34. The first end of the joint receiving member 351 is fixed to the base member 3521. The side member 3523 may be hollow and includes therein a bearing assembly 3526 that provides support to one end of the main body 3411 of the fourth link 34 opposite the output disc of the fifth revolute joint 375. In another embodiment, the configuration of the fifth link 35 may change according to actual needs. For example, the fourth link 34 may define a U-shaped space that has an open end facing from the third link 33. In this case, a timing belt may be used to transmit rotation form the fifth revolute joint to the fifth link having one end rotatably received in the U-shaped space. In yet another embodiment, the fourth link 34 may be in an L-shaped form.

Figure 18:
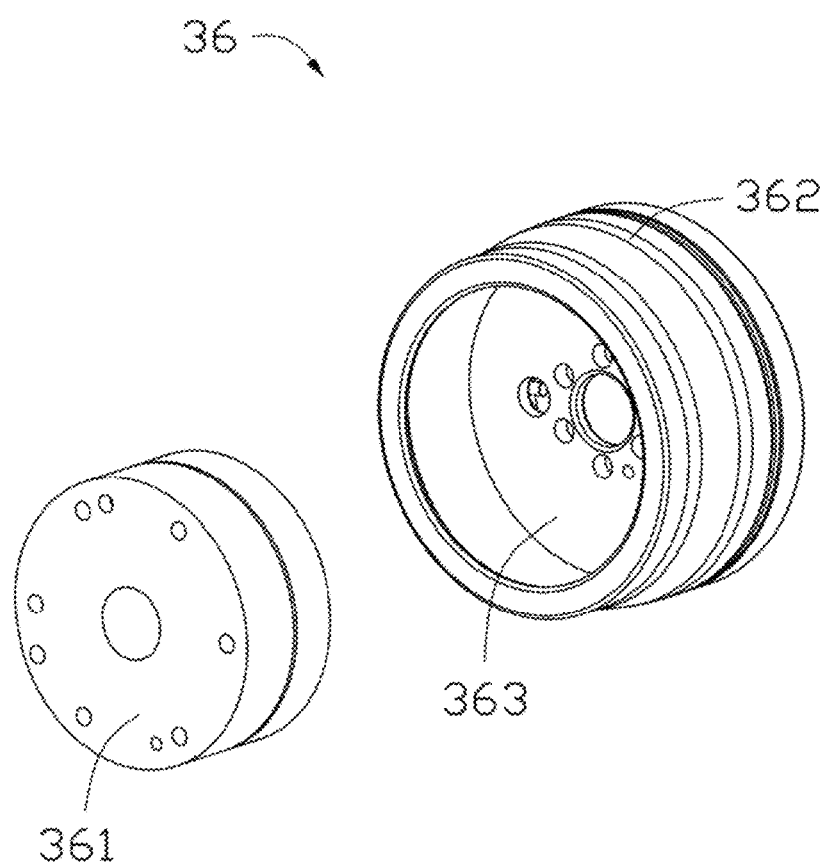
FIG. 18 is an isometric exploded view of a force torque sensor module according to one embodiment.

With reference to FIG. 18, the mechanical arm 30 further includes a six-axis force torque sensor module 36. The end effector 100c is coupled to the fifth link 35 through the six-axis force torque sensor module 36. The six-axis force torque sensor module is configured to detect three axes forces and three axes torques applied to the end effector 100c. Measurements of the six-axis force torque sensor module 36 are fed back to a controller for control of the end effector 100c. In one embodiment, the six-axis force torque sensor module 36 includes a sensor module 361 for detecting three axes forces and three axes torques applied to the end effector 100c, and a sensor holder 362 that the sensor 361 is coupled to. In one embodiment, the sensor holder 362 may define a cavity 363, and the sensor module 361 is fit in the cavity 363. The sensor holder 362 is fixed to and rotatable together with the output disc 3761 of the sixth revolute joint 376, and the end effector 100c is fixed to the sensor module 361.

In one embodiment, the mechanical arm 30 may further include a number of sensor coverings (e.g., electronic skin) disposed on one or more outer surfaces of at least one of the first link 31, the second link 32, the third link 33, the fourth link 34, and the fifth link 35. The sensor coverings are configured to detect an object touching or in proximity to the one or more outer surfaces via conductive properties of the sensor coverings. For example, the sensor coverings may include sensor coverings 41 and 42 (FIG. 9) that cover almost all the outer surface of the third link 33, a sensor covering 43 (FIG. 16) that is arranged on the lateral surface of the joint receiving member 341 of the fourth link 34, a sensor covering 44 (FIG. 16) that is arranged on the lateral surface of the connecting member 341 of the fourth link 34, and a sensor covering 45 (FIG. 16) that is arranged on the outer surface of the connection portion 3412 of the fourth link 34. The sensor coverings may further include a sensor covering 46 (FIG. 22) arranged on the lateral surface of the joint receiving member 351 of the fifth link 35, and sensor coverings 47 (FIG. 22) that are arranged on outer surfaces of the side members 3522 and 3523 of the fifth link 35. It should be noted that the arrangement of the sensor coverings may change according to actual needs.

Figure 19A:
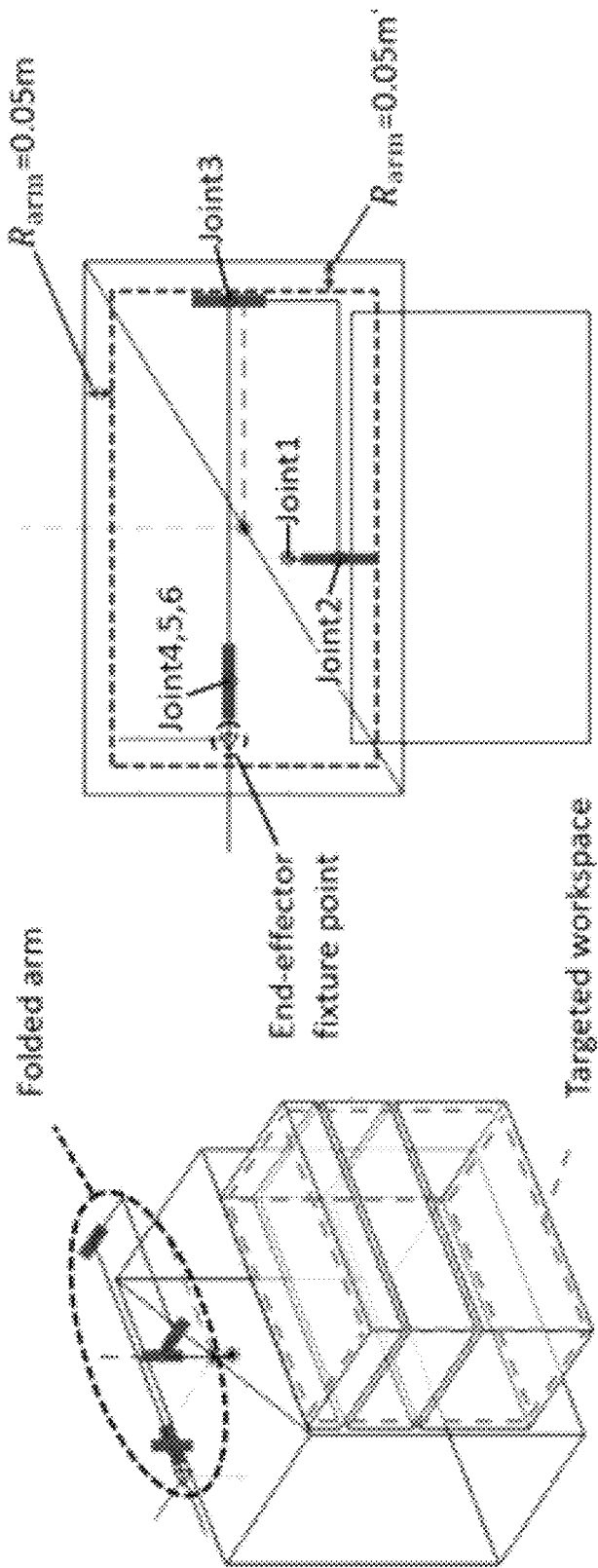
FIG. 19A is a schematic diagram showing configuration and boundary of a kinematics model of a mechanical arm and its targeted working space according to one embodiment.
Figure 19B:
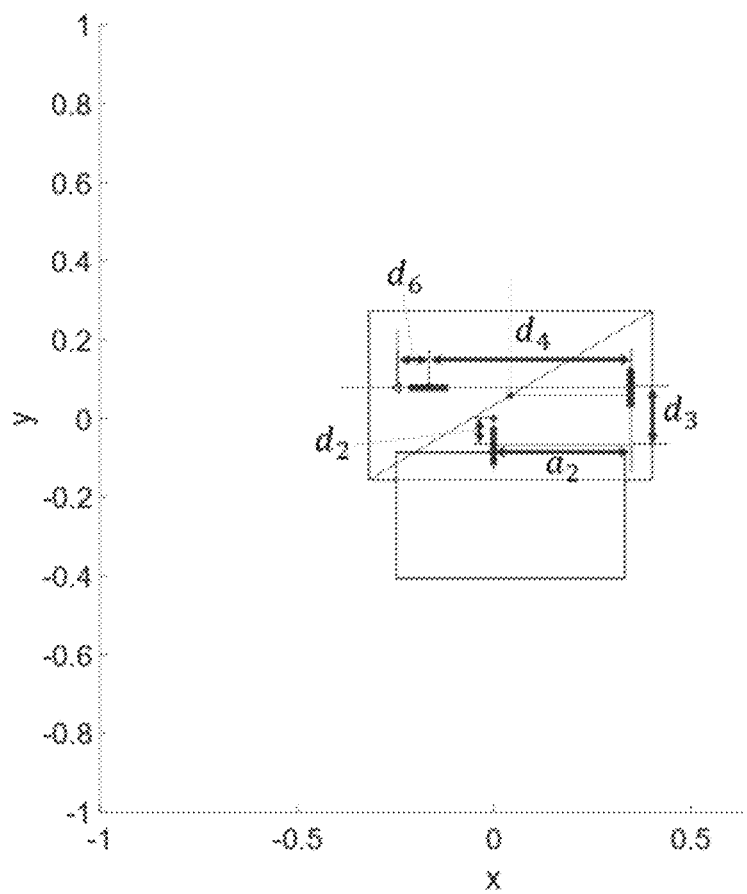
FIG. 19B is a top view of a schematic diagram of the kinematics model of the mechanical arm of FIG. 19A.
Figure 19C:
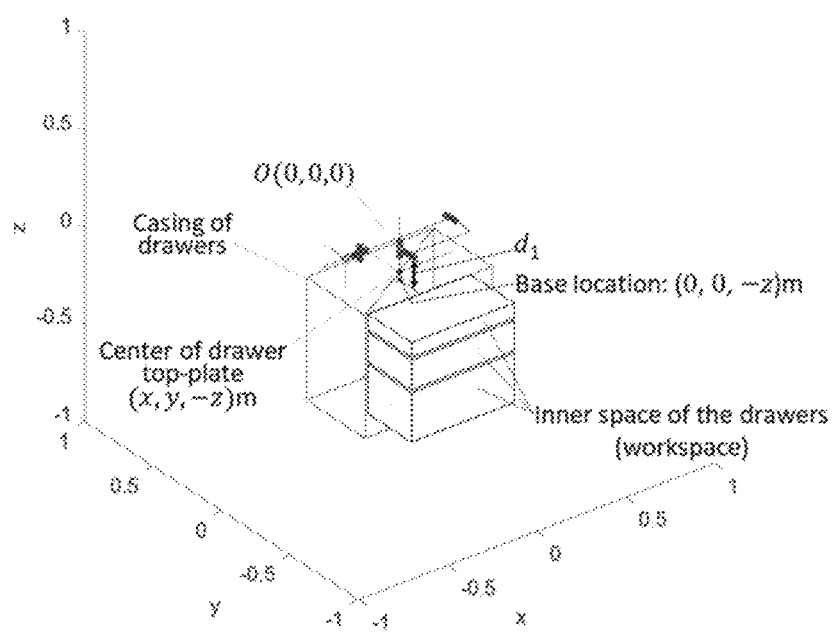
FIG. 19C is a schematic diagram showing the kinematics model of the mechanical arm attached to a movable platform and the workspace.

With reference to FIGS. 19A to 19C, a kinematics model of a mechanical arm (e.g., mechanical arm 10, 10a, 20a, 20b, or 30) is created. In one embodiment, the kinematics model may be used to optimize the Denavit-Hartenberg (DH) parameters of the mechanical arm, such that the mechanical arm can have a maximum reachability to one or more workspaces within the storage drawers of a movable platform (e.g., moveable platform 300) without bumping into the structure or surfaces of the movable platform. As shown in FIG. 19A, joint 1 represents the first revolute joint that drives the first link of the mechanical arm to rotate about a first vertical axis. Joint 2 represents the second revolute joint that drives the second link to rotate with respect to the first link about a second axis that is substantially orthogonal to the first axis. Joint 3 represents the third revolute joint that drives the third link to rotate with respect to the second link about a third axis that is substantially parallel to the second axis. Joints 4, 5 and 6 represent the fourth, fifth, and sixth revolute joints that drive the fourth link to rotate with respect to the third link, drive the fifth link to rotate with respect to the fourth link, and drive an end effector (e.g., end effector 100a, 100b, or 100c) to rotate with respect to the fifth link.

FIG. 19A is a schematic diagram showing configuration and boundary of a kinematics model of a mechanical arm according to one embodiment. In one embodiment, a base coordinate system is established, with the center of the joint 1 being the origin, the lengthwise direction of the storage drawers as the X axis, the widthwise direction of the storage drawers as the Y axis, and the heightwise direction of the storage drawers as the Z axis. The coordinates of the center of the top of the movable platform is (x, y, −z), where x, y and z are greater than zero. The projections of the joints 1-6 onto the X-Y plane are shown in FIG. 19B. The projection of the joint 1 onto the X-Y plane is a point that coincides with the origin of the base coordinate system. The projection of the joint 2 onto the X-Y plane is a line segment that lies on the X axis. The projection of the joint 3 onto the X-Y plane is a line segment that is perpendicular to the projection of joint 2. The projections of the joints 4-6 onto the X-Y plane are represented by a line segment that is parallel to the projection of the projection of joint 2.

The following parameters can be defined after the kinematics model of the mechanical arm and the base coordinate system are created. Specifically, d1 is the distance between the joint 2 and the top of the movable platform. d2 is the distance between the center of the projection of the joint 2 and the origin of the base coordinate system. a2 equals to the length of the projection of the line segment, starting at the center of the joint 2 and ending at the center of the joint 3, onto the X axis. d3 equals to the length of the projection of the line segment, starting at the center of the joint 2 and ending at the center of the joint 3, onto the Y axis. d4 is the distance between the centers of the projections of the joints 3-6.

Figure 20:
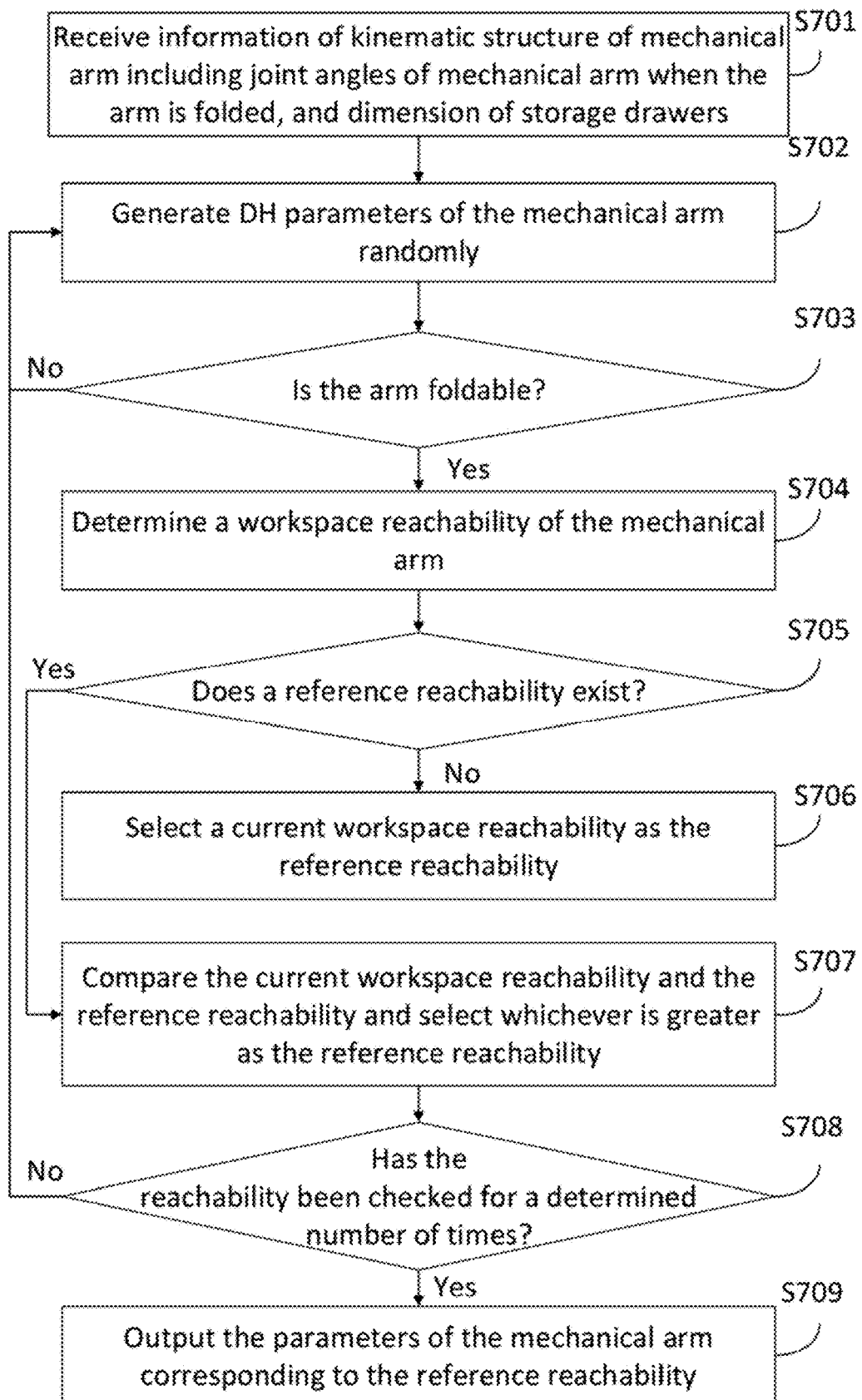
FIG. 20 is a schematic flowchart of a method for determining parameters of the mechanical arm.

FIG. 20 is a flowchart illustrating an embodiment of a method for determining parameters of a mechanical arm (e.g., mechanical arm 10, 10*a*, 20*a*, 20*b*, or 30). The method may include the following steps. Step S701: Receive information of kinematic structure of the mechanical arm including joint angles of the mechanical arm when the mechanical arm is folded, dimension of storage drawers of a movable platform (e.g., moveable platform 300), and outer envelope of the mechanical arm. The joint angles of the mechanical arm refer to the angles of the revolute joints of the mechanical arm when the mechanical arm is in the folded state (e.g., folded state as shown in FIG. 9). The dimension of the storage drawers includes the width, the length, and the depth of the storage drawers.

Step S702: Generate the DH parameters of the mechanical arm randomly. In one embodiment, the parameters may include the coordinates x and y of the center of the top of the movable platform, and distances d1, d2, a2, d3, d4, and d6, where d6 is the distance between the center of the projection of the joints 4-6 and a center of the end effector. Random values will be generated and assigned to these parameters.

Step S703: Determine if the mechanical arm is foldable inside the boundary of the top of the movable platform. After random values have been assigned to x, y, d1, d2, a2, d3, d4, and d6, it can be determined if there is a point of the joints 1-6 and the end effector that falls out of a predetermined area, based on the information received at the Step S701. If there is such a point, the mechanical arm cannot be folded inside the boundary of the top of the movable platform, and the process goes back to Step S702. Otherwise, the process goes to Step S703. The predetermined area is a rectangular area smaller than the top of the movable platform. For example, if the maximum radius of each link of the mechanical arm is not greater than 0.05 m, the distance between the long sides of the predetermined area and the long sides of the top of the movable platform is not less than 0.05 m, and the same applies to the distance between the short sides of the predetermined area and the top of the movable platform. In addition, size of the end effector may also be a factor to determine the predetermined area.

Step S704: Determine a workspace reachability of the mechanical arm to the storage drawers. The workspace reachability here refers to a ratio of the volume within the storage drawers that the end effector can reach to the total volume of the space within the storage drawers. The workspace reachability can be used to evaluate if kinematic configuration of the mechanical arm is sufficient for required tasks. Many approaches have been proposed to determine the reachable workspace that an end effector can reach. One such approach is described below.

For example, one approach uses direct kinematics-based algorithms to compute the reachable workspace points. Specifically, in this approach, a redundant robot manipulator is modeled as a series of links coupled with either revolute or prismatic joints. It is assumed without loss of generality that each joint has one degree of freedom. A joint with m degrees of freedom is modeled as m joints coupled with links of zero lengths. A coordinate frame is attached to each link in order to describe the relationship between two consecutive links. A homogeneous matrix Ai is used in order to describe the relationship between consecutive frames. The elements of matrix A are computed by using Denavit-Hartenberg notations for both prismatic and revolute joints. The Denavit-Hartenberg (DH) convention is used to assign coordinate frames to each joint of a robot manipulator in a simplified and consistent fashion. The transformation matrix A for a revolute joint is:

$$A_i = Rot_{z,\theta_i} Trans_{z,d_i} Trans_{x,a_i} Rot_{x,\alpha_i} = \begin{vmatrix} c_{\theta_i} & -s_{\theta_i}s_{\alpha_i} & s_{\theta_i}s_{\alpha_i} & a_i c_{\theta_i} \\ s_{\theta_i} & c_{\theta_i}c_{\alpha_i} & -c_{\theta_i}s_{\alpha_i} & a_i s_{\theta_i} \\ 0 & s_{\alpha_i} & c_{\alpha_i} & d_i \\ 0 & 0 & 0 & 1 \end{vmatrix}$$

where the four quantities θi, ai, di, αi are parameters associated with link i and joint i. The four parameters ai, αi, di, and θi in are generally given the names link length, link twist, link offset, and joint angle, respectively. The OH convention for a robot manipulator is well known and will not be described in detail here. In the case of a revolute joint, θi, is called the joint variable and the other three fixed quantities (di, ai, αi) are called the link parameters.

The description of the end effector with respect to the base, denoted by Tn, is given by Tn=A1A2 . . . An−1An. The computational cost of computing each point is θ(n), where n is the number of degrees of freedom that are associated with joints in the path from the end effector to the proximal linkage. Workspace points that are computed by direct kinematics do not necessarily lie on the surface boundary, so an edge detection algorithm can be used to obtain the workspace boundary as well as any voids inside the reachable workspace. This can be achieved by computing the dimensions of the cube that encompasses the workspace points. In one example, the cube is divided into cells according to a required resolution of the application. If the cell contains a workspace point, it is marked with one and zero if it does not contain a reachable point. A workspace cell is considered a boundary cell if any of its neighbors is marked with zero. The matrix Tn can be a 4×4 matrix. The first, second, and third element in last column of this matrix are the x-coordinate, y-coordinate, and z-coordinate of the position of the end-effector in the base coordinate system. With such an approach, the points that are located within the storage drawers and can be reached by the end effector can be determined. The workspace reachability to the storage drawers can thus be determined. That is, the ratio of the volume occupied by these points to the total volume of the space within the storage drawers can be determined.

Figure 21:
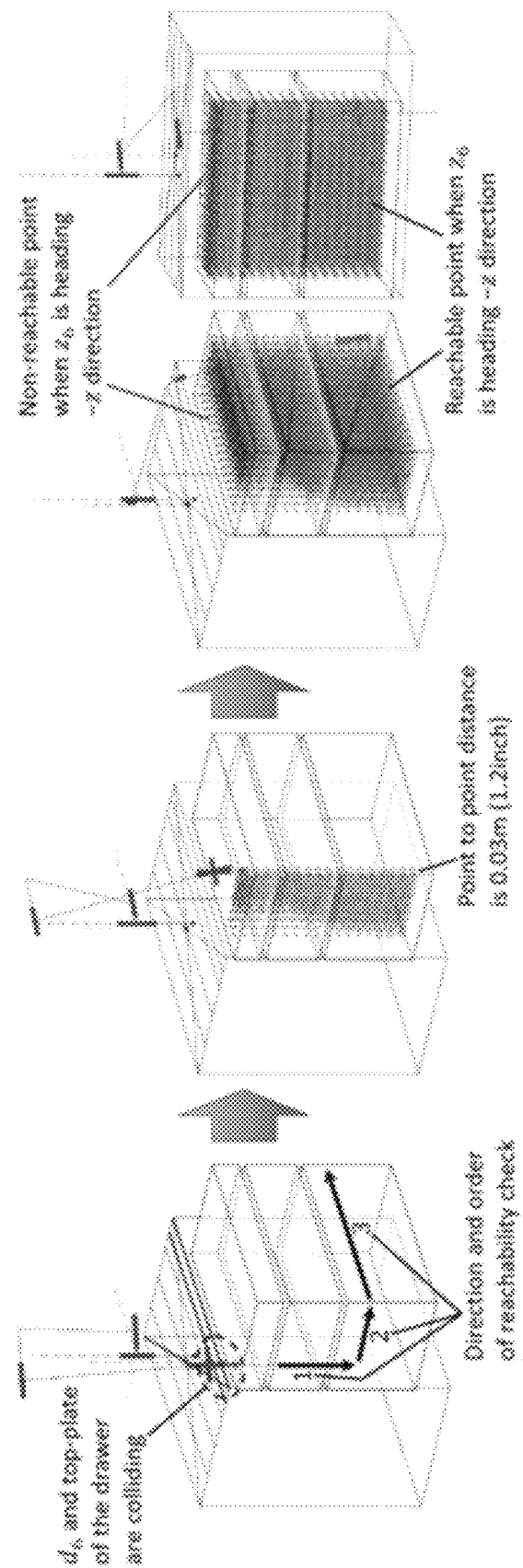
FIG. 21 is a schematic diagram showing in what order the reachability of points within the drawers are determined.

In another embodiment, inverse kinematics may be used to compute the reachable workspace. Specifically, inverse kinematics is the mathematical model of calculating the variable joint parameters needed to place the end effector of an end effector in a given position and orientation. For a given position, if there is one or multiple solutions for the joint parameters, then the given position is a reachable position. As shown in FIG. 21, an imaginary three-dimensional grid of points within the storage drawers will be checked to determine which of these points are reachable by the end effector of the mechanical arm. For the position of each of these points, a calculation will be performed using inverse kinematics expressions to determine if there is one or multiple solutions for the joint parameters that enable the end effector to reach the point. The points can be checked in a predetermined order. For example, the points can be seen as being located on a number of parallel planes, and all the points on a first plane will be checked first, and then all the points on the second plane until all the points on the last plane. With such an approach, the points that located within the storage drawers and can be reached by the end effector can be determined. The workspace reachability to the storage drawers can thus be determined. That is, the ratio of the volume occupied by these points to the total volume of the space within the storage drawers can be determined.

Figure 22:
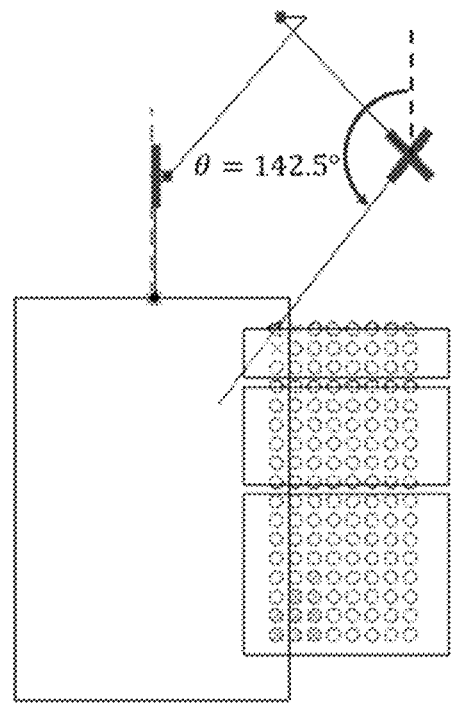
FIG. 22 is a schematic diagram showing a mechanical arm in a determined pose to access the inner portion of the first workspace of a movable platform.

As described above, in one embodiment, an imaginary three-dimensional grid of points, within the storage drawers, may be used to check to determine which of these points are reachable by the end effector of the mechanical arm. The heading direction of the fourth link of the mechanical arm will affect the workspace reachability to the storage drawers. As shown in FIG. 22, under the condition that other variables are kept unchanged, the heading direction of 142.5 degrees allows for the end effector to have a maximum workspace reachability for a given workspace. The heading directions of 110 and 157.5 degrees can also bring satisfactory workspace reachability. The combination of the heading directions at 110 degrees, 157.5 degrees, and 142.5 degrees allow for the end effector to reach almost all the workspace inside the storage drawers.

With reference to FIG. 20 again, Step S705: Determine if a reference reachability exits. If the reference reachability exits, the process goes to Step S707, otherwise, the process goes to Step S706. The reference reachability is a reference value that will be compared with the workspace reachability determined at Step S704, so as to find a greatest workspace reachability.

Step S706: Select a current workspace reachability as the reference reachability.

Step S707: Compare the current workspace reachability with the reference reachability and select whichever is greater as the reference reachability.

Step S708: Determine if the determination of the workspace reachability of Step S704 has reached a predetermined number of times. If the determination of the workspace reachability of Step S704 has reached predetermined times, the process goes to Step S709, otherwise, the process goes back to Step S702. In one embodiment, the value of the predetermined times may be set to 1000.

Step S709: Output the parameters of the mechanical arm corresponding to the reference reachability.

In one embodiment, when the determination of the workspace reachability of Step S704 has not reached predetermined times, then determine if the times of the determination of the workspace reachability of Step S704 is greater than a preset value (e.g., 10). If the workspace reachability is greater than a preset value, the process goes to Step S710. Otherwise, the process goes back to Step S702.

Step S710: Generate parameters of the mechanical arm by randomly changing each of the parameters of the mechanical arm associated with the reference reachability by ±n %, where n is greater than zero. The process then goes back to Step S703.

The parameters determined according to the method of FIG. 20 enables the mechanical arm to have a satisfactory workspace reachability to the storage drawers, such that the end effector can reach almost any workspace within the storage drawers.

Figure 23A:
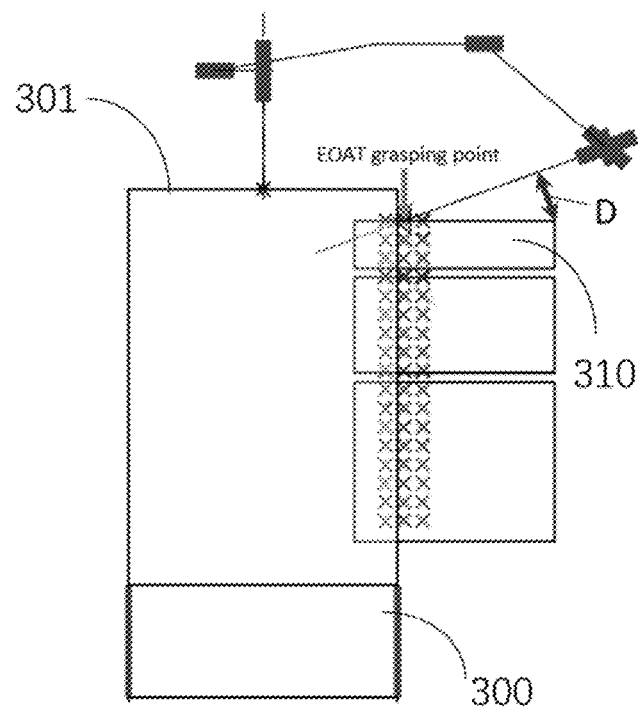
FIG. 23A is a schematic diagram showing reachability of the end effector of the mechanical arm of a first workspace of a movable platform.
Figure 23B:
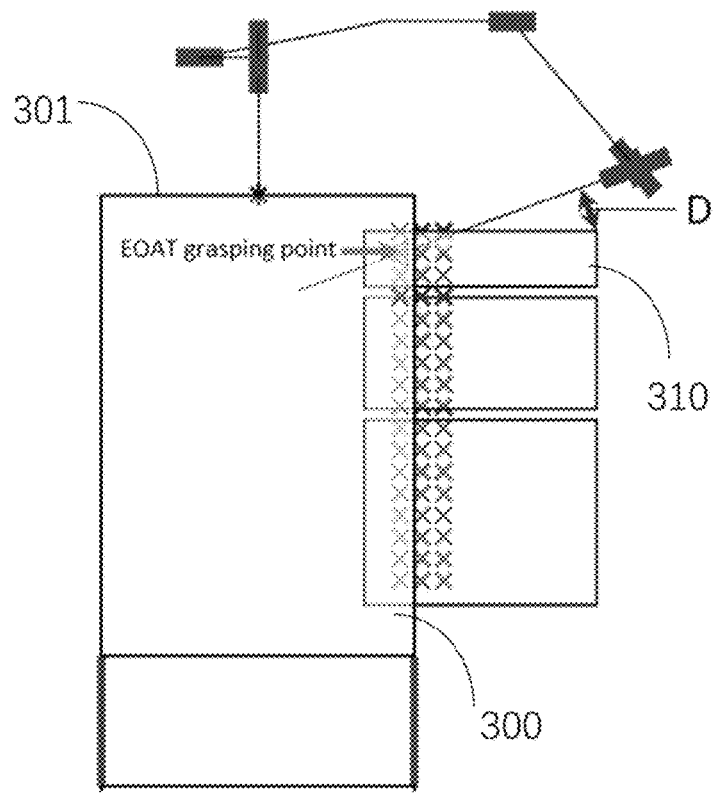
FIG. 23B is another schematic diagram showing reachability of the end effector of the mechanical arm of the first workspace of the movable platform.
Figure 23C:
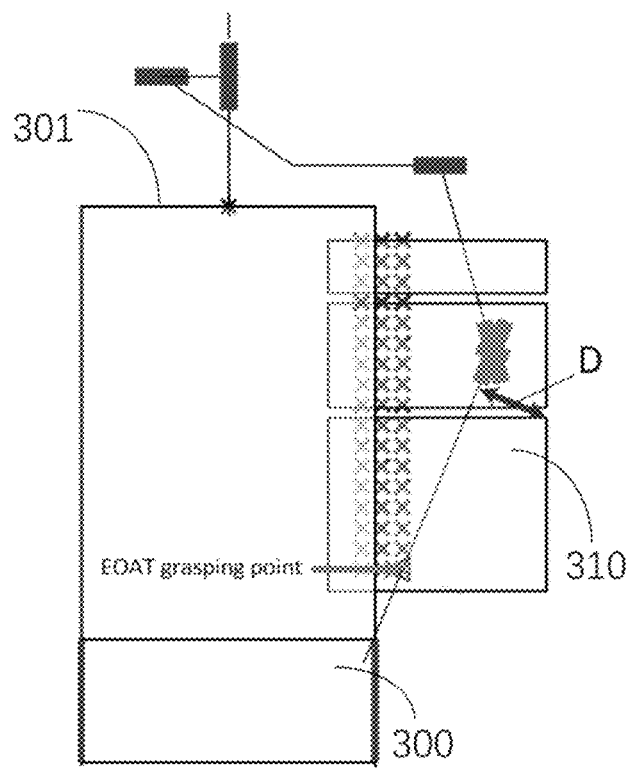
FIG. 23C is yet another schematic diagram showing reachability of the end effector of the mechanical arm of the third workspace of the movable platform.

During the process as shown in FIG. 20, a reachability map may be created. In the reachability map, representation of the reachability is given by a spatial grid which covers the position or a position and orientation workspace. In this case, a binary value is stored, indicating whether a grid cell is reachable or not reachable, or each cell holds additional information, such as quality values, which allows to compare different grid cells with each other. As shown in the FIGS. 23A to 23C, the cross marks represent part of the points that are to be checked to determine which of these points are reachable by the end effector. During the process as shown in FIG. 20, a collision check is also performed to determine if the mechanical arm will bump into the storage drawers. For example, FIGS. 23A and 23B show that the end effector of the mechanical arm 30 is reaching two different points inside an upper storage drawer 310, which are located below the top surface 301 of the movable platform 300. FIG. 23C shows that the end effector of the mechanical arm 30 is reaching a point inside a lower storage drawer 310, which is located below the top surface 301 of the movable platform 300.

A distance D between the axis of rotation of the fourth link 34 and a top edge of each of the upper storage drawer 310 and the lower storage drawer 310 are calculated. The distances D are then compared with a predetermined value depending on the position of the points to be checked. For example, in scenarios as shown in FIGS. 23A and 23C, the distances D are greater than a maximum distance between the axis of rotation of the fourth link 34 and an outer surface of the side members 3522/3523 of the fifth link 35, which means that there is sufficient space to allow the fifth link 35 to move. Thus, there is no collision between the mechanical arm 30 and the storage drawers 310 in the scenarios as shown in FIGS. 23A and 23C.

As described above, when there is sufficient space for the fifth link 35 to move, there will not be collision between the mechanical arm 30 and the storage drawers 310. However, if the distance D is less than the maximum distance between the axis of rotation of the fourth link 34 and an outer surface of the side members 3522/3523 of the fifth link 35, there is still a chance that the mechanical arm 30 will not bump into the storage drawers 310. For example, in a scenario as shown in FIG. 23B, the portion of the fifth link 35 having the maximum distance is located at an outer side of an imaginary plane that is orthogonal to the axis of rotation of the fourth link 34 and passes through the top edge of the upper storage drawer 310. The outer side is defined to be a side away from the upper storage drawer 310. In this case, if the distance D is greater than the radius of the joint receiving member 351 of the fifth link 35, the joint receiving member 351 of the fifth link 35 can enter into the upper storage drawer 310 without collision with the top edge of the upper storage drawer 310.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A mechanical arm, comprising:
  a first link protruding from a surface;
  a second link rotatably coupled to the first link and having an elongated body defining a first end and an opposite second end, the first end rotatable about an axis of rotation orthogonal to an axis of rotation of the first link;
  a third link comprising a first end and an opposite second end, the first end rotatably coupled to the second end of the elongated body, the third link having an axis of rotation same as an axis of rotation of the second end of the elongated body;

a fourth link rotatably coupled to the second end of the third link, the fourth link having an axis of rotation orthogonal to the axis of rotation of the third link;

a fifth link rotatably coupled to the fourth link, the fifth link having an axis of rotation orthogonal to the axis of rotation of the fourth link;

an end effector connectable to the fifth link, wherein the end effector is rotatable about an axis of rotation same as the axis of rotation of the fourth link, and rotatable about an axis of rotation orthogonal to the axis of rotation of the fourth link; and a first revolute joint and a second revolute joint, wherein the first link is connectable to the surface through the first revolute joint, the second revolute joint is configured to rotatably connect the second link to the first link, the first revolute joint and the second revolute joint are received in the first link at two ends of the first link;

wherein the first link, the second link, the third link, the fourth link, and the fifth link are collectively structured and configured to rotate such that the end effector is actuatable to a workspace under the surface;

wherein the second link, the third link, the fourth link, and the fifth link are configured to rotate into a folded state;

wherein in the folded state, a height of each of at least the second link and the third link with respect to the surface is less than a height of the first link with respect to the surface.

2. The mechanical arm of claim 1, further comprising a sixth link rotatably coupled to the fifth link, the sixth link having an axis of rotation orthogonal to the axis of rotation of the fifth link; the sixth link attachable to the end effector and configured to, in conjunction with the first link, the second link, third link, the fourth link, and the fifth link, actuate to a workspace on a side and below and under the surface.

3. The mechanical arm of claim 1, further comprising a plurality of brakes mated to corresponding revolute joints in at least one of the first link, the second link, the third link, and the fourth link, and are configured to selectively stop movement of the mechanical arm, so as to hold the mechanical arm in a determined pose.

4. The mechanical arm of claim 1, further comprising sensor coverings disposed on one or more outer surfaces of at least one of the first link, the second link, the third link, and the fourth link, wherein the sensor coverings are configured to detect an object touching or in proximity to the one or more outer surfaces.

5. The mechanical arm of claim 1, further comprising a third revolute joint and a fourth revolute joint, wherein the third link is rotatably coupled to the second link through the third revolute joint, the fourth revolute joint is configured to rotatably connect the fourth link to the third link, the third revolute joint and the fourth revolute joint are received in the third link at two ends of the third link.

6. The mechanical arm of claim 1, wherein the first link comprises a housing that comprises a first portion and a second portion in electronic communication with each other and are orthogonal to each other, and wherein the first revolute joint is received in the first portion and the second revolute joint is received in the second portion.

7. The mechanical arm of claim 1, further comprising a six-axis force torque sensor module, the end effector is coupled to the fifth link through the six-axis force torque sensor module, the six-axis force torque sensor module is configured to detect forces and torques applied to the end effector.

* * * * *